United States Patent
Russell et al.

(10) Patent No.: US 7,172,738 B2
(45) Date of Patent: Feb. 6, 2007

(54) METHODS AND APPARATUS FOR PROCESSING MIXTURES OF LIQUIDS AND SOLIDS

(76) Inventors: Matthew F. Russell, 4408 W. Elderberrt St., Spokane, WA (US) 99208; Robert L. Russell, P.O. Box 298, Kellogg, ID (US) 83837; James J. Moore, 413 E. Avenida Sierra Madre, Gilbert, AZ (US) 85296

( * ) Notice: Subject to any disclaimer, the term of this patent is extended or adjusted under 35 U.S.C. 154(b) by 488 days.

(21) Appl. No.: 10/447,801

(22) Filed: May 29, 2003

(65) Prior Publication Data
US 2003/0223927 A1    Dec. 4, 2003

Related U.S. Application Data

(60) Provisional application No. 60/384,370, filed on May 29, 2002.

(51) Int. Cl.
*B01D 11/02* (2006.01)
(52) U.S. Cl. .................. 422/261; 422/274; 422/276
(58) Field of Classification Search ................ 422/261, 422/274, 276
See application file for complete search history.

(56) References Cited

U.S. PATENT DOCUMENTS

| 3,958,947 | A | | 5/1976 | Robinson et al. |
| 4,048,344 | A | * | 9/1977 | Gasser et al. ............... 426/385 |
| 4,160,647 | A | * | 7/1979 | Sendov et al. .............. 422/106 |
| 4,387,110 | A | * | 6/1983 | Emmi et al. ................ 426/430 |
| 4,545,892 | A | * | 10/1985 | Cymbalisty et al. ........ 208/391 |
| 5,096,678 | A | | 3/1992 | Mackie |
| 5,295,665 | A | | 3/1994 | Mackie |

* cited by examiner

*Primary Examiner*—Krisanne Jastrzab
(74) *Attorney, Agent, or Firm*—Reidlaw, L.L.C.; John S. Reid

(57) ABSTRACT

One embodiment provides for a liquids/solids reaction vessel configured to contain a mixture of at least one liquid and at least one solid. The vessel includes a closed perimeter wall defined by an effective height, and a bottom connected to the closed perimeter wall to thereby define a vessel volume configured to contain the mixture. The reaction vessel further includes a solids extraction system located in at least one of the bottom or in the perimeter wall proximate the bottom. The effective height is selected to produce a pressure proximate the bottom of the reaction vessel selected to eject the at least one solid through the solids extraction system under the influence of gravity alone. The effective height can be further selected to cause an increase in a reaction rate between the at least one liquid and the at least one solid.

35 Claims, 18 Drawing Sheets

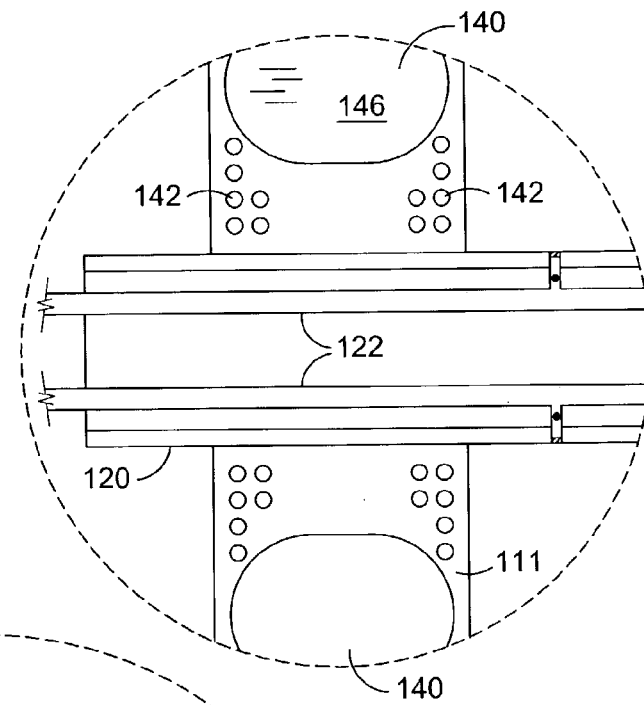
FIG. 10
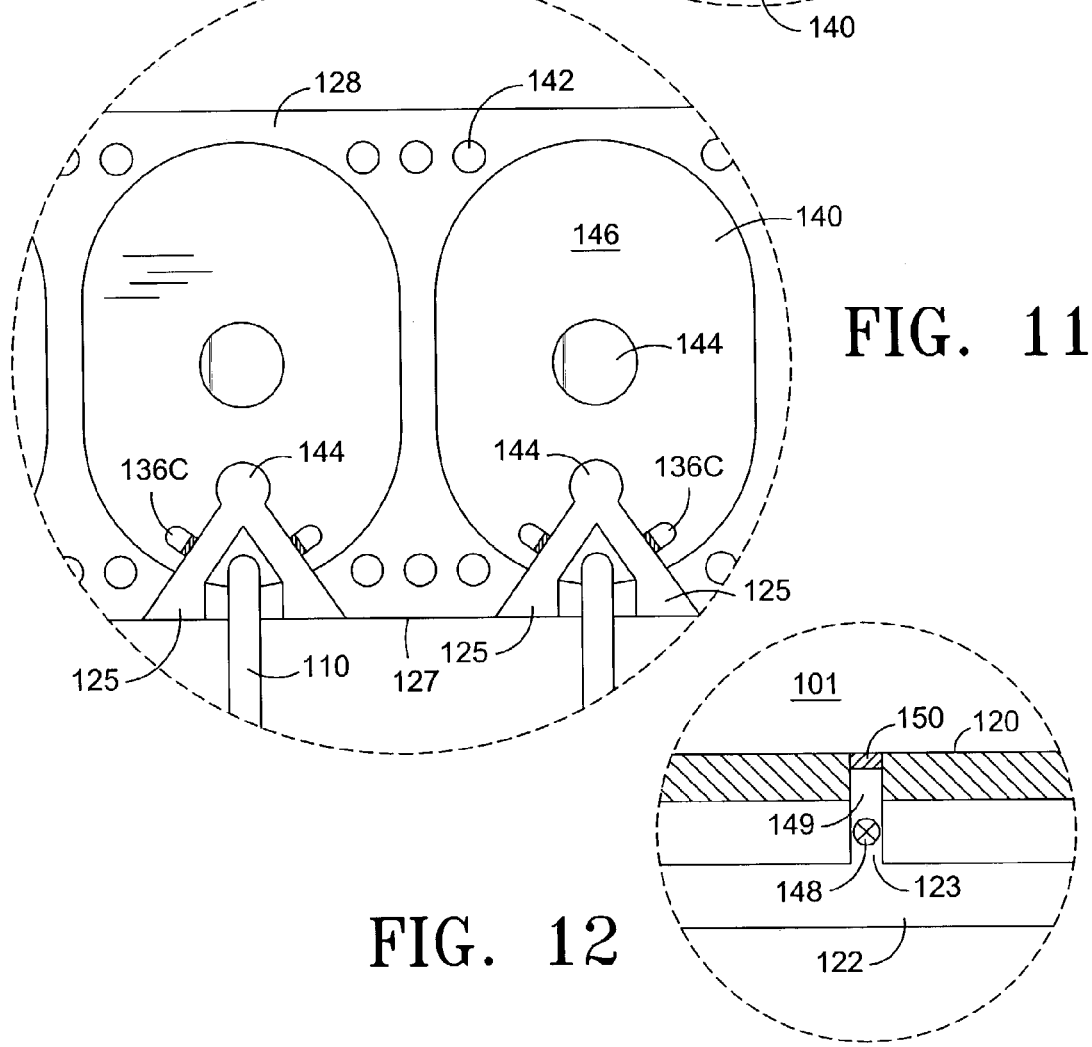
FIG. 11
FIG. 12

METHODS AND APPARATUS FOR PROCESSING MIXTURES OF LIQUIDS AND SOLIDS

CROSS REFERENCE TO RELATED APPLICATIONS

The present application claims priority under 35 U.S.C. § 120 to U.S. Provisional Patent Application Ser. No. 60/384,370, filed May 29, 2002 and entitled, "Methods And Apparatus For Processing Ores And Other Solids", which is hereby incorporated herein by reference in its entirety.

BACKGROUND

Many applications are known wherein a liquid is reacted with a particulated solid ("solids") to enhance one or the other of the liquid or the solids (or both) for commercial benefit. One common application is to react a liquid "lixivant" with a solid to extract a soluble compound from the solid by way of percolating or washing the solid with the liquid. (Accordingly, a "lixivant" is a liquid used for this purpose.) This process is commonly described as "leaching". Typical examples include extracting valuable metals from ores containing the metals by contacting the ores with a lixivant. The extracted metals will then be in solution with the lixivant, and can be later removed from the lixivant by known chemical processes, such as chemical precipitation, to render a relatively pure form of the extracted metals, or a form that can be subsequently processed to render a relatively pure form of the extracted metals. One example is to wash ore containing gold with a lixivant containing cyanide to remove the gold from the ore. Other examples include washing oil shales with a solvent to extract petroleum from the shales, and washing coal with a sulfur-extracting liquid to remove sulfur from the coal. Yet another example includes contacting contaminated soil with a liquid-borne biological agent (or agents) to thereby decontaminate the soil.

In all of these processes the volumes of solids to be treated are typically considerable—on the order of tens to thousands of metric tons per day. In the case of ore leaching (to remove valuable metals from ores containing the metals), the most common process is to pile the ore into a "heap" on a leach pad, and then to introduce a lixivant onto the top of the heap. After the lixivant has passed through the ore heap via gravity, the lixivant is collected and processed to remove the extracted metals from the lixivant. The spent ore is then discarded (as for example by moving it to a spent ore pile), and new unprocessed ore is then placed on the leach pad, and the process repeated. Such leach pads often occupy areas covering many acres, and in some cases square miles. Due to the nature of the lixivants used, and the metals being extracted from the ores, leach pads are typically subject to significant environmental controls to reduce the possibility of potential contamination of soil surrounding the leach pad. Further, the ore leaching process via ore heaps and leach pads is a slow process. Common leach times (i.e., the time between when the ore heap is initially formed and the lixivant added to the ore heap, and the time when the ore is considered "spent" and is removed from the leach pad) are on the order of months. A six month leach time is not uncommon.

Other prior leaching methods and apparatus include: (1) batch tank leaching, (2) agitated vat leaching, (3) counter-current tank leaching, (4) permanent pad heap leaching (described briefly above), (5) re-usable pad heap leaching, and (6) bio-heap leaching. A common description for each of these methods and apparatus is a "leach circuit".

The specific shortcomings of the prior art are as follows.

For agitated vat leaching, the basic operational concept is to provide an elevated contact rate of lixivant and other additives to the surfaces of the ore particles by (a) increasing the surfaces of the ore which can be accessed by the lixivant by grinding the ore to a particle size that exposes the desired metal or mineral value, (b) vigorously agitating the ore and lixivant so as to provide an elevated level of contact between unconsumed reaction agents, and (c) to readily remove reaction outputs so as to maintain in majority concentration the unconsumed reaction agents.

The shortcomings of such a process include: (1) significant capital and operational costs are associated with grinding the ore to a small particle size and vigorously agitating such a dense media as an ore slurry; (2) the processing time required for the desired recovery level—as short as 24 hours in the typical case—in conjunction with the size limitations for a vessel which will afford reasonably good economic access of the agitation mechanical to the ore slurry, necessitates a large number of containment vessels, which in turn necessitates a plant of commensurate size to contain and support the operation of the containment vessels, all of which requires significant capital and real estate to construct; (3) small particle sizes typically present challenges for disposal of spent ore since special impoundments are typically required to de-water and stabilize it as permanent fill; (4) because of the relatively high capital and operating costs of such a leach process, the method is not economical for very low grade ores or ores which require leach times in excess of 24 hours to achieve economic recovery; (5) batch processing contains an inherent limitation in that there is wasted economic time between batch operations; and (6) because of the complexity of such a mechanically intensive process, design and construction times for the plant are relatively long (as compared to heap leaching, for example).

Heap leaching is an alternative to vat leaching and attempts to address the limitations of vat leaching with respect to low grade ores and ores that require longer leach recovery times (e.g., using certain oxides and certain sulfides). The basic operational concept of heap leaching is to trade-off leach recovery time for leach circuit processing size or volume by (1) secondary or tertiary crushing of the ore instead of crushing to an ultra-fine grain size, (2) agglomerating the ore into relatively uniform ore spheres to increase permeability of lixivant and increase contact effectiveness rather than agitating the ore, (3) stacking in broad, relatively shallow piles on an impermeable layer instead of batching in expensive vessels, (4) sprinkling lixivant on the ore, letting it trickle down under the action of gravity alone through the ore, and collecting the pregnant solution from perforated pipes on the bottom of the heap rather than submerging the ore within a vat or tank, (5) blowing air into the heap (as in the case of bio-heap leaching), and (6) removing the ore continuously from the pad as in the case of re-usable pads to make heap leaching a more continuous rather than a batch process.

Although heap leaching extends leaching technology to lower grade and harder-to-leach ores that are not economically done with vat leaching because of the implied processing volume required, heap leaching is less effective in extracting metals and the like from the ores, primarily due to the absence of submersion of the ore in the lixivant and agitation of the ore (as in agitated vat leaching). Of particular concern in the use of a trickle-type application of lixivant to a stack or pile of ore on a leach pad is channeling of the lixivant, leaving significant portions of the leach pile without sufficient lixivant to extract the theoretical maximum recoverable metals using the heap.

Another inherent shortcoming of heap leach is the inability to control environmental inputs such as temperature and oxygenation of the heap, which are critical factors in bio-heap leaching where the effectiveness of the bacteria is closely dependent on these variables.

Perhaps the greatest shortcoming of heap leaching is the capital and operating costs associated with large volumes of material, especially in the case of re-usable pads. Whereas in vat leaching the ore is transported in a slurry in pipe conduits, heap leaching, because of the large geometric extents of leach pads and complexity of stacking a stable heap, has been performed almost exclusively with conventional overland conveyors and specialized spreading and reclaim conveyors, which imply high capital and operating costs as compared to the compact plant piping of vat leaching.

What is needed then is an economical, efficient method and/or apparatus to react solids and liquids with one another that achieves the benefits to be derived from similar prior art apparatus and methods, but which avoid the shortcomings and detriments individually associated therewith.

SUMMARY

One embodiment of the present invention provides for a liquids/solids reaction vessel configured to contain a mixture of at least one liquid and at least one solid. The vessel includes a closed perimeter wall defined by an effective height, and a bottom connected to the closed perimeter wall to thereby define a vessel volume configured to contain the mixture. The reaction vessel further includes a solids extraction system located in at least one of the bottom or in the perimeter wall proximate the bottom. The effective height is selected to produce a pressure proximate the bottom of the reaction vessel selected to eject the at least one solid through the solids extraction system under the influence of gravity alone. The effective height can be further selected to cause an increase in a reaction rate between the at least one liquid and the at least one solid.

Another embodiment of the present invention provides for a method of treating solids with a liquid. The method includes providing a vessel, filling the vessel with the solids to a preselected solids depth, and placing the liquid in the vessel to a preselected liquid depth. The solids depth and the liquid depth are selected to produce a reaction zone within the vessel where a reaction between the solids and the liquid is initiated or accelerated. In one example the preselected solids depth is at least 24 meters, and the preselected liquid depth is at least 3 meters above the solids, or at least 27 meters.

Yet another embodiment of the present invention provides for a method of treating solids with a liquid. The method includes providing a vessel defining solids outlet openings, filling the vessel with the solids to a preselected solids depth, and placing the liquid in the vessel to a preselected liquid depth. The method further includes extracting the solids at the solids outlet openings under the influence of gravity alone. In one example the preselected solids depth is at least 24 meters, and the preselected liquid depth is one of at least 27 meters or at least 3 meters above the solids.

These and other aspects and embodiments of the present invention will now be described in detail with reference to the accompanying drawings, wherein:

DESCRIPTION OF THE DRAWINGS

FIG. 10 is a detail diagram of components of a liquid supply system depicted in FIG. 9.

FIG. 11 is a detail diagram of a portion of a perimeter wall of the reaction vessel depicted in FIG. 9.

FIG. 12 is a detail diagram of components of the liquid supply system depicted in FIG. 10.

DETAILED DESCRIPTION

As will be described more particularly below, embodiments of the present invention provide for a reaction vessel useful for reacting a liquid, or liquids, with a solid, or solids. One particularly useful application of the methods and apparatus disclosed herein is in leaching ore to remove metals contained in the ore, such as gold, silver, etc. However, the methods and apparatus of the present invention should not be considered as limited to such applications, but rather can be applied to many different processes wherein a liquid and a solid are contacted to allow one to react with the other. Further, the methods and apparatus of the present invention are useful for liquid/solids contacting wherein no reaction occurs. Examples include washing solids, or other liquid/solids contact processes wherein an exchange of concentrations occurs as a result of the contact (e.g., a concentration of a substance in the liquid is increased or decreased as a result of contacting the solids with the liquid). Embodiments of the present invention provide many of the advantages of prior art leach circuits, without many of the disadvantages thereof, described above. Examples of solids that can be processed using the methods and apparatus of the present invention include, among others, ores and solids like coal, shales and tar sands, tailings, ore residues, slags, concentrates, middling products, wastewater sludges, coal refuse, filter cake, placer gravels, and mineral sands.

Figure 1:
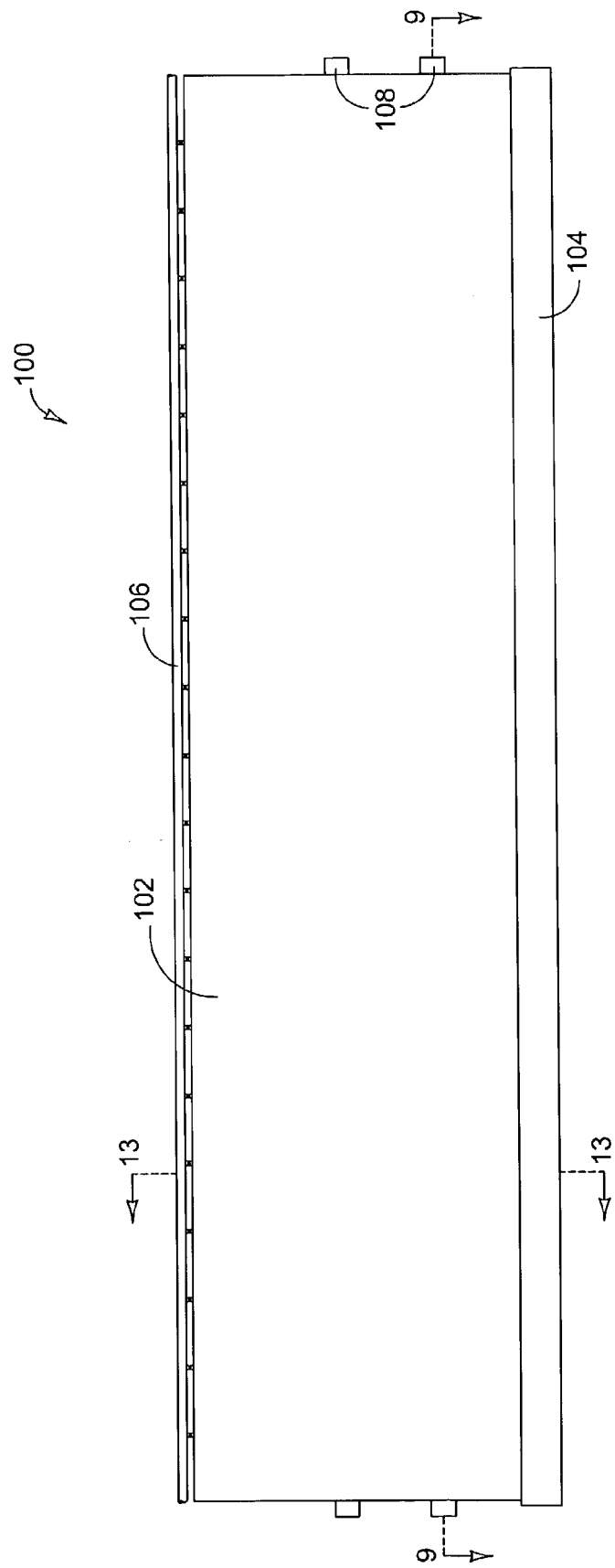
FIG. 1 is a side elevation view depicting a liquids/solids reaction vessel in accordance with one embodiment of the present invention.
Figure 2:
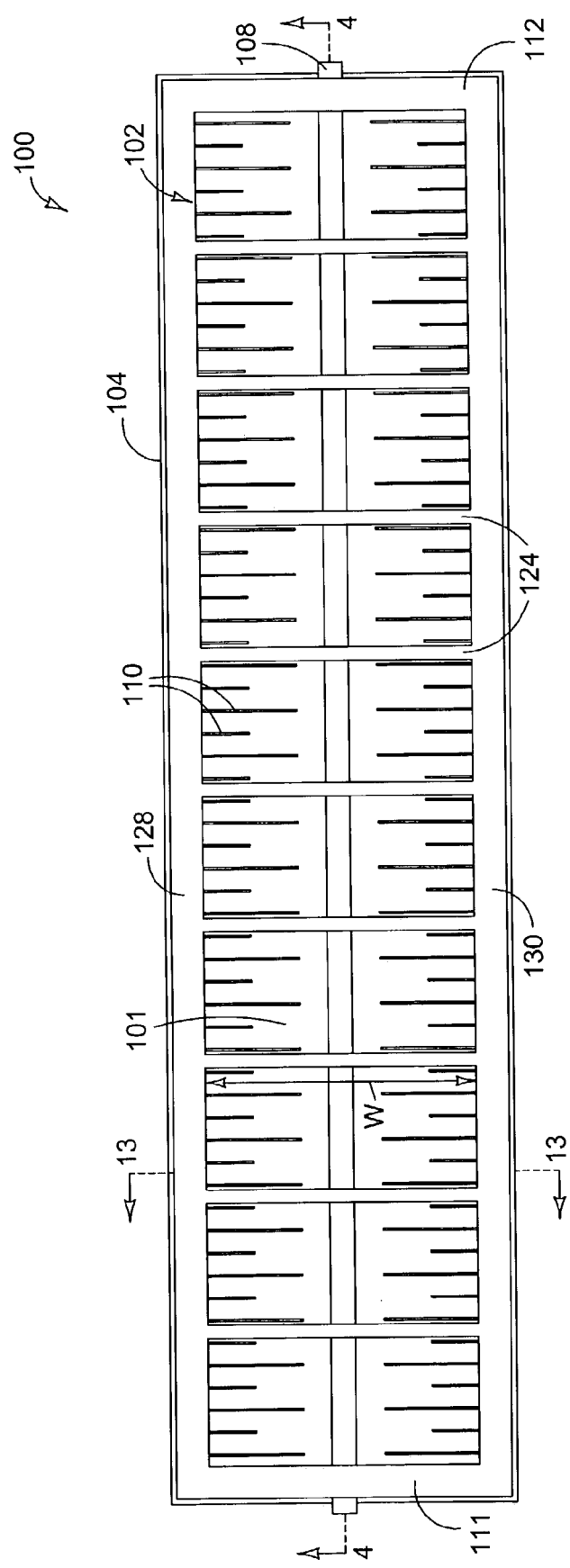
FIG. 2 is a plan view depicting the reaction vessel depicted in FIG. 1.
Figure 3:
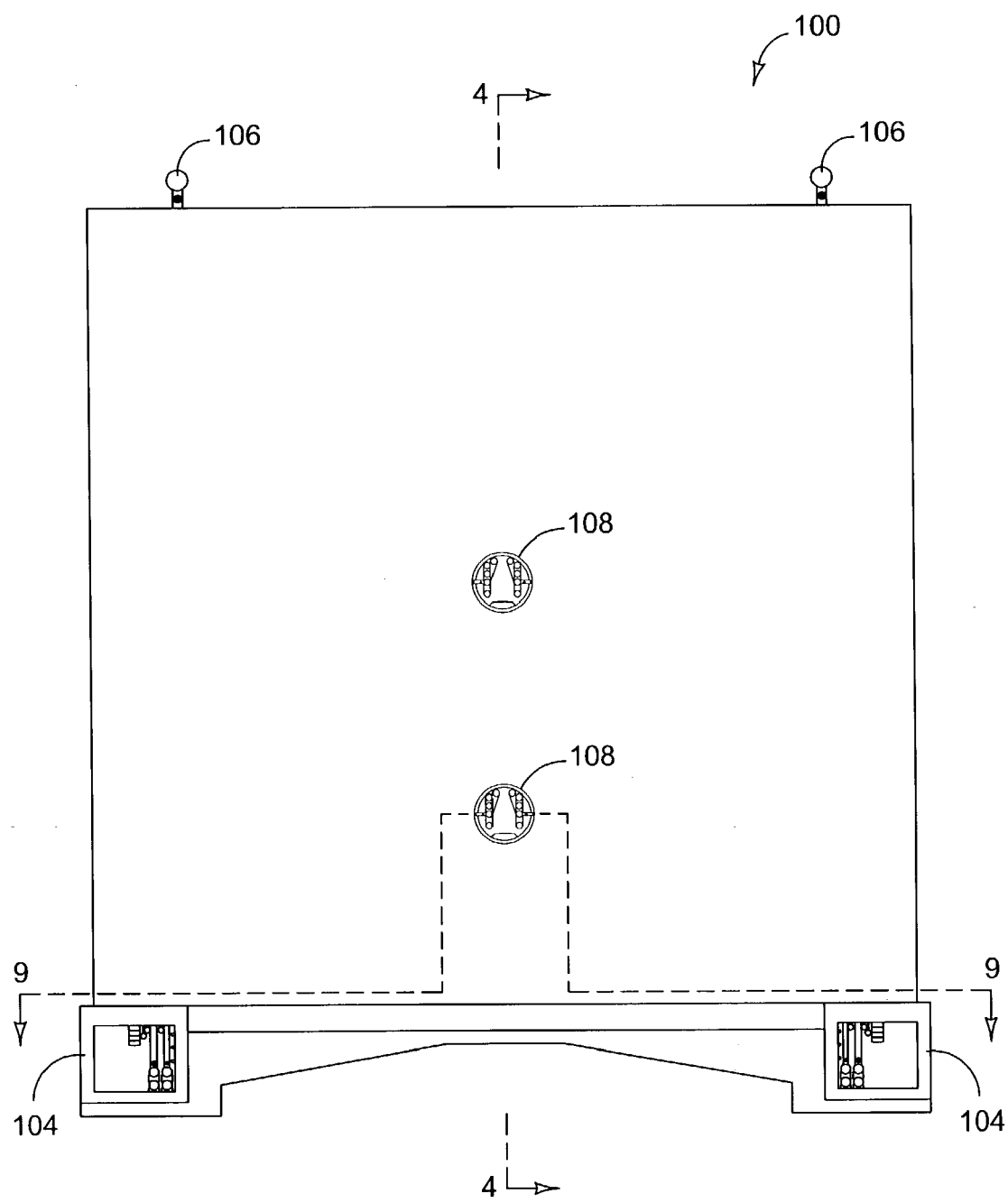
FIG. 3 is an end view depicting the reaction vessel depicted in FIGS. 1 and 2.

Turning now to FIG. 1, a side elevation view of a reaction vessel 100 in accordance with one embodiment of the present invention is depicted. The reaction vessel 100 is further depicted in a plan view in FIG. 2, and an end view in FIG. 3. FIGS. 1, 2 and 3 will be described together. The reaction vessel 100 includes a closed perimeter wall 102 which defines an interior vessel volume 101 of the reaction vessel. As can be seen in FIG. 2, the perimeter wall 100 includes two generally parallel sidewalls 128, 130, and two generally parallel endwalls 111 and 112 which are connected to the sidewalls to thereby form a generally rectangular form of the perimeter wall 102 when viewed in a plan view. Spreader beams 124 can be provided to hold the sidewalls 128, 130 into relatively fixed positions with respect to one another, particularly when the reaction vessel 100 is filled with a solid/liquid mixture. It will be appreciated that the perimeter wall 102 can define other geometries when viewed in the plan view, such as a square form, a round form, or other closed forms. The reaction vessel 100 is supported on a foundation or base 104, which can be a concrete structure formed by known concrete forming methods. The reaction vessel 100 includes a liquid supply system (partially shown by conduit systems 106 and 108), and a liquid extraction or removal system (partially shown by conduits 110). The reaction vessel 100 further includes a solids extraction system (partially shown by conduits 110, and described further below). Solids can be added to the reaction vessel 100 by means such as conveyers and the like (not shown, such being well understood in the material handling arts) which deposit the solids into the interior volume 101 at the top of the vessel. Traveling conveyors and the like can be used to distribute the solids as they are placed in the interior volume 101 of the vessel 100. Further, the solids can be added to the vessel along with the liquid, such that the liquid supply system is a combination liquid/solids supply system. Alternately, the solids can be conveyed to a mixing or pulping chamber (not shown) located at the base (near foundation 104) of or near the upper perimeter edge 103 of vessel 100, wherein the solids are mixed with water and/or lixivant solutions to form a slurry that can be pumped throughout the interior volume 101 by means of, or in parallel with, the conduit delivery system 106. For relatively compact plan areas, a single discharge 106 can be used, but for a large plan area of vessel 100 multiple mixing chambers can be used to limit the length of conduit runs, especially for conduits carrying solids slurry of a large top size (e.g. minus 2").

In an exemplary operation (described more fully below), solids are placed in the interior volume 101 of the reaction vessel 100, and a liquid is placed in the interior volume of the vessel via the liquid supply system (in no particular order). Generally the liquid will cover the solids, but this is not a requirement. As a result of the liquid being in contact with the solids in the vessel 100, a desirable reaction will occur (such as the leaching of metals from ore (the solids) by a lixivant (the liquid)). Following the reaction, the solids are removed from the vessel 100 by flowing them through the solids removal system (described more fully below), and the liquid is removed from the vessel by the liquid extraction system. The solids are preferably extracted from the vessel along with a portion of the liquid to enhance the flow of the solids through the solids removal system. As will be seen in the following discussion, the solids extraction system extracts the solids from the interior volume 101 of the reaction vessel 100 proximate to, and/or at the bottom 180, of the reaction vessel 100. Generally, the liquid is also extracted from the interior volume 101 of the reaction vessel 100 proximate to, and/or at the bottom 180, of the reaction vessel 100. In one embodiment, as the solids and liquid are extracted from the reaction vessel 100, additional solids and liquid are added to the interior volume 101 of the vessel, such that an essentially continuous process of reacting the solids with the liquids can occur. In this way a concurrent flow of solids and liquids through the vessel 100, generally in a top-to-bottom flow pattern, will be established. As will be describe more fully below, the solids and liquid are preferably extracted from the reaction vessel 100 along the length of the vessel, rather than at one end or the other. Alternately solids and/or liquids can be extracted in a differential manner for relatively broad plan sections to allow for longer or shorter residence times for the solids and liquids in different regions of the vessel 100.

Figure 4:
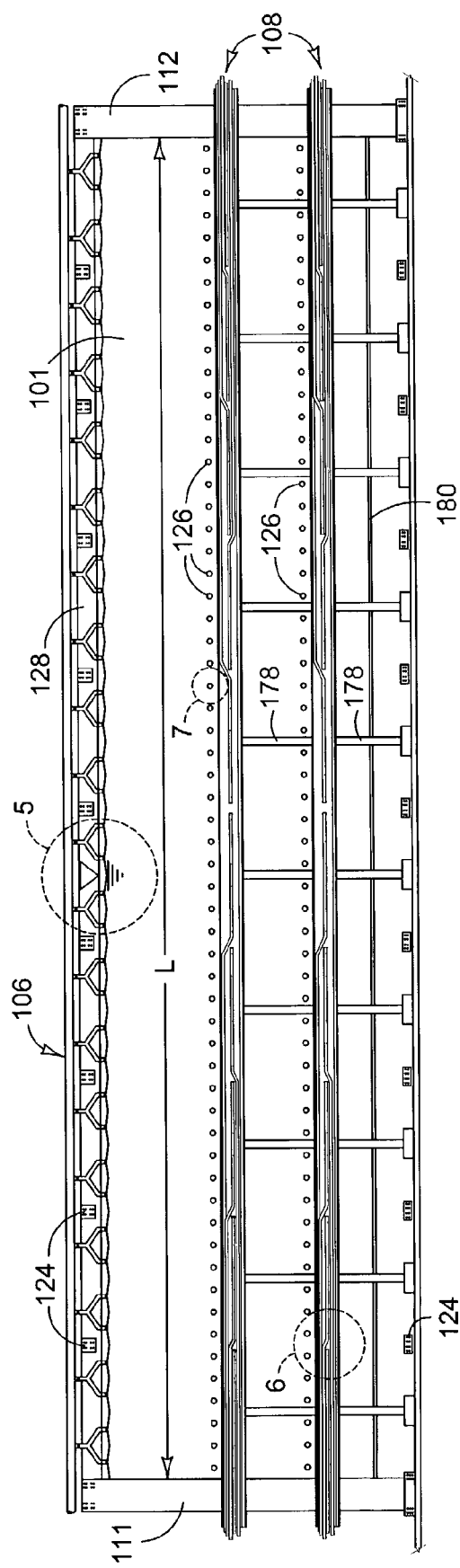
FIG. 4 is a side elevation sectional view depicting the reaction vessel depicted in FIGS. 1–3.

Turning now to FIG. 4, a side elevation sectional view of the reaction vessel 100 of FIG. 1 is depicted. The reaction vessel 100 further includes a bottom 180. The spreader beams 124 (upper and lower) are seen in side sectional view. The liquid delivery system (not generally numbered) includes an upper liquid supply header system 106 and intermediate liquid supply header systems 108. The intermediate liquid supply system headers 108 are oriented below the upper liquid supply header 106, and above the bottom 180 of the reaction vessel 100. The intermediate liquid supply system headers 108 are supported in the interior 101 of the vessel 100 by stanchions 178. Liquid extraction ports (a.k.a., liquid outlet openings) 126, which are part of the liquid extraction system (not generally numbered), are defined in rows along the sidewall 128. It will be appreciated that similar liquid extraction ports 126 can be defined in the opposite sidewall 130 (FIG. 2). It will also be appreciated that the liquid extraction ports 126 do not have to be arranged in straight rows, but can be staggered with respect to one another.

Figure 5:
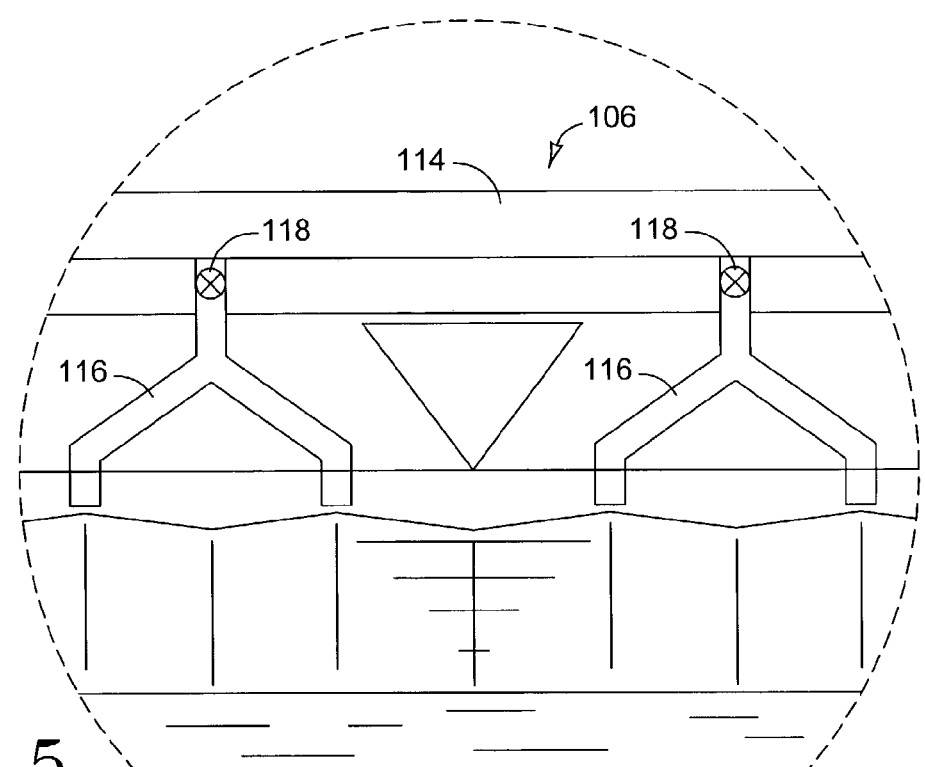
FIG. 5 is a detail diagram of components of a liquid supply system depicted in FIG. 4.

Turning to FIG. 5 a side elevation detail diagram of a portion of the upper liquid supply header 106 is depicted. The liquid supply header 106 includes a liquid supply manifold 114, and branch conduits 116 which are in liquid communication with the manifold 114 at a first end, and which terminate at a liquid supply outlet (not numbered) at a second end to allow liquid to be supplied to the interior 101 of the reaction vessel 100. Liquid supply control valves 118 can be placed in the branch conduits 116 to control the flow of liquid into the reaction vessel 100 along the length "L" (FIG. 4) of the interior volume 101.

Figure 6:
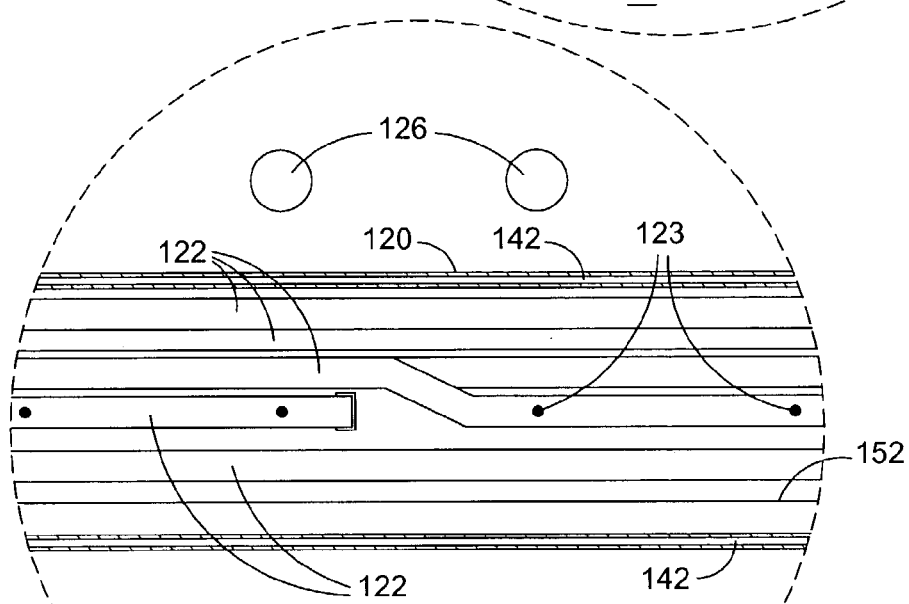
FIG. 6 is a detail diagram of further components of a liquid supply system depicted in FIG. 4.
Figure 13:
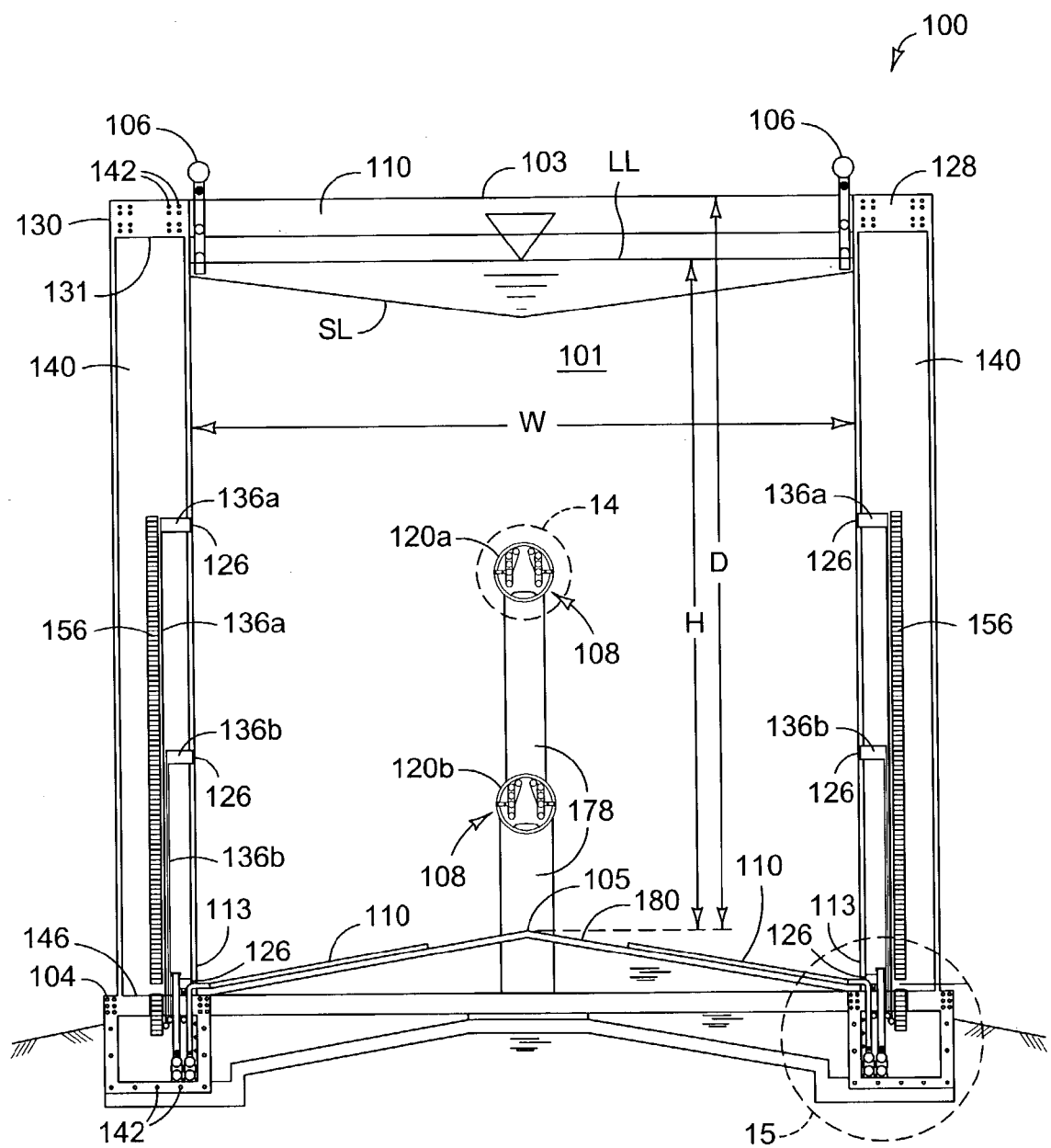
FIG. 13 is an end elevation, sectional view of the reaction vessel depicted in FIGS. 1–3.
Figure 14:
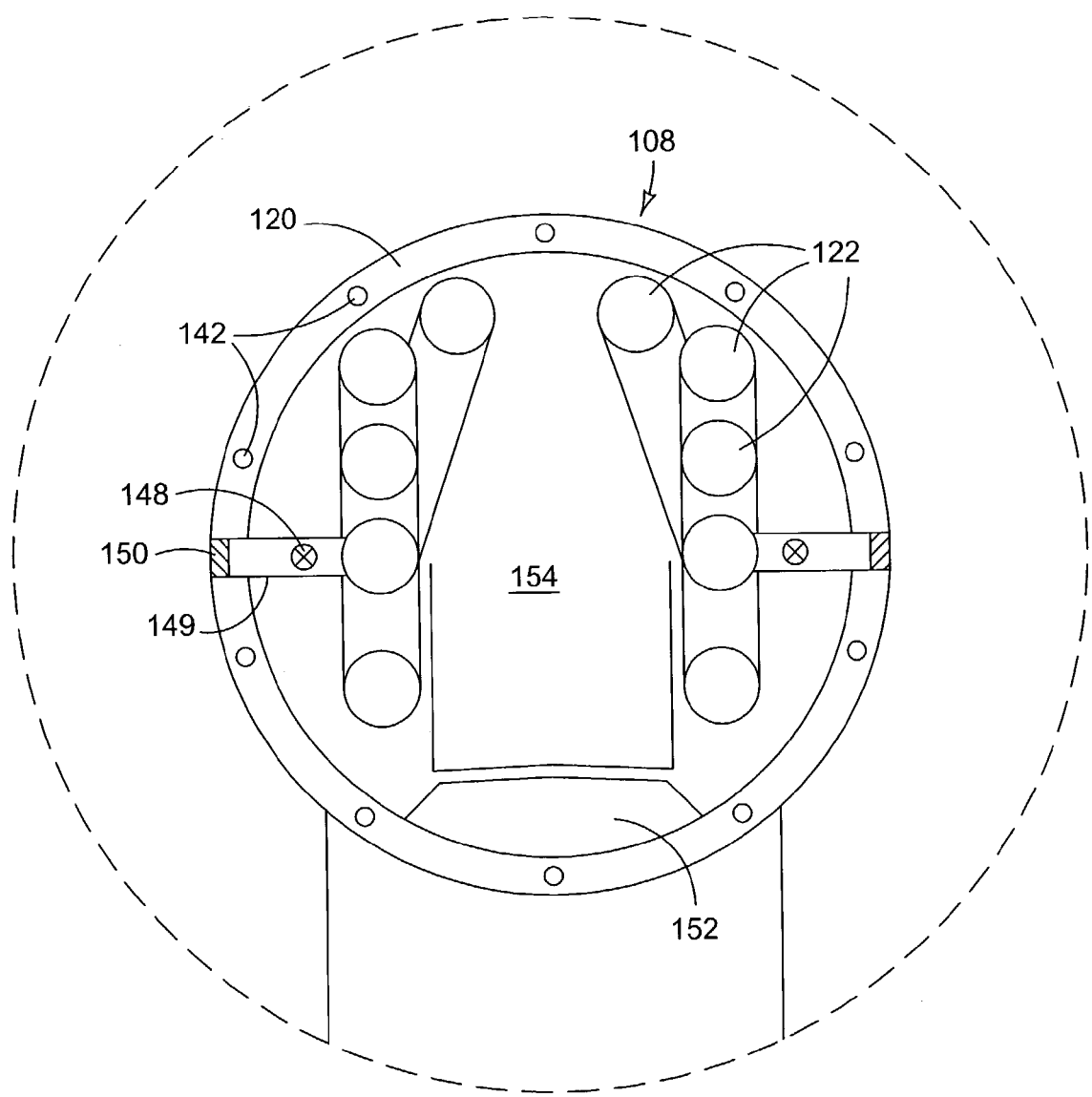
FIG. 14 is an end sectional view detail diagram of components of the liquid supply system depicted in FIGS. 10 and 13.

Turning to FIG. 6, a side elevation detail diagram of a portion of one of the intermediate liquid supply headers 108 is depicted. The intermediate liquid supply header 108 includes a casing 120 which houses a plurality of intermediate liquid supply conduits 122. The casing 120 (and thus the conduits 122 therein) is located approximately equidistant between the sidewalls 128, 130, and is further located between the upper edge (103, FIG. 13) of the sidewalls and the bottom 180 (see FIG. 13). The liquid supply conduits 122 are staggered in length along the casing 120 such that they terminate at different points along the length "L" (FIG. 4) of the interior volume 101 of the reaction vessel 100. Near the terminal end of each liquid supply conduit 122 the conduit has liquid outlet openings 123 defined therein, which correspond to openings (not shown) in the casing 120, thus allowing liquid from the liquid conduits 122 to flow into the interior volume 101 of the reaction vessel 100. Turning briefly to FIG. 12, a detail plan view of a portion of one of the liquid supply conduits 122 and the casing 120 is depicted. The opening 123 in the liquid supply conduit 122 communicates with the interior volume 101 of the reaction vessel via an opening (unnumbered) in the wall of the casing 120, and via a connector conduit 149. A control valve 148 can be placed in each connector conduit 149. A screen or filter 150 can be placed in the opening in the casing 120 to inhibit movement of solids from the interior volume 101 into the liquid conduit 122. The use of several liquid supply conduits 122 within the casing 120 (FIG. 6) allows for a more equal pressure along the length of each conduit to be maintained, thus allowing a more equal distribution of liquid from the intermediate liquid supply header 108 along the length "L" of the vessel 100. Further, each liquid supply conduit 122 can be provided with a separate liquid control valve (not shown). As an alternate to providing more than one liquid conduit 122 in the casing 120, a single liquid supply conduit can be used, and the liquid outlet openings along the length of the conduit can be sized to an even distribution of liquid (e.g., outlet openings near the endwalls 111 and 112 will be smaller than openings near the center of the interior volume 101 to account for pressure loss as the liquid moves from the area near the endwalls to the central area). Alternately, control valves (such as control valves 148 of FIG. 12) can be used at each liquid outlet point along a single common liquid conduit to control distribution of the liquid. Turning briefly to FIG. 14, an end sectional view of one of the intermediate liquid supply subsystems 108 of FIG. 4 is depicted. The casing 120, the liquid conduits 122, the connector conduits 149, and the control valves 148 can be seen in end view. The casing 120 case be strengthened with post-tensioning tendons 142. A walkway or platform 152 can be provided in the casing 120, thus providing an access-way 154 for service personnel and the like to access the conduits 122 and control valves 148 for servicing.

Figure 7:
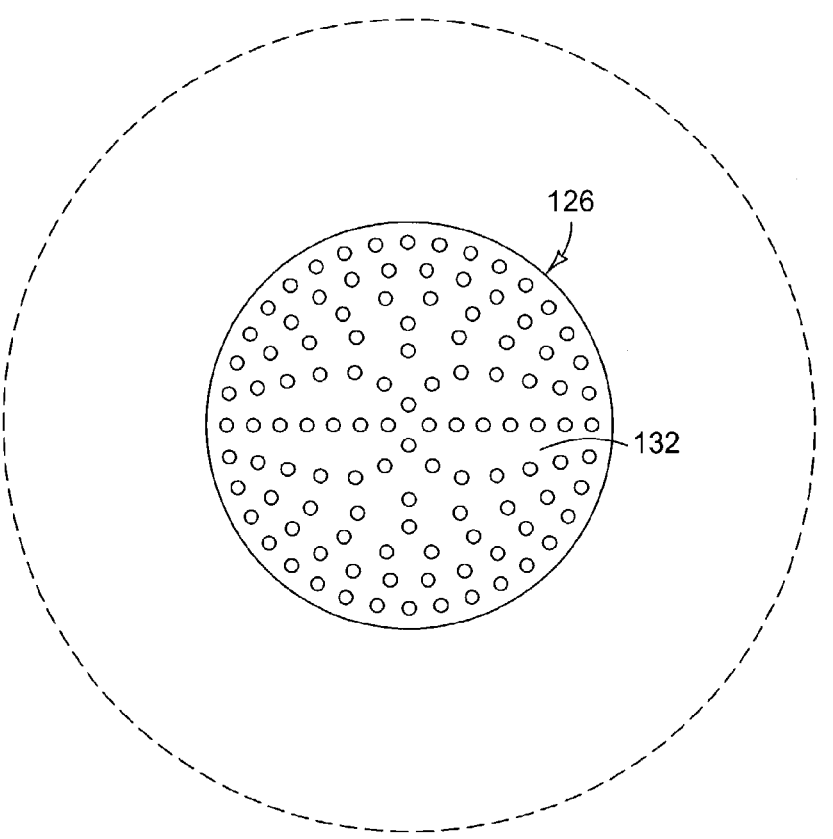
FIG. 7 is a detail of a component of a liquid extraction system depicted in FIG. 4.
Figure 8:
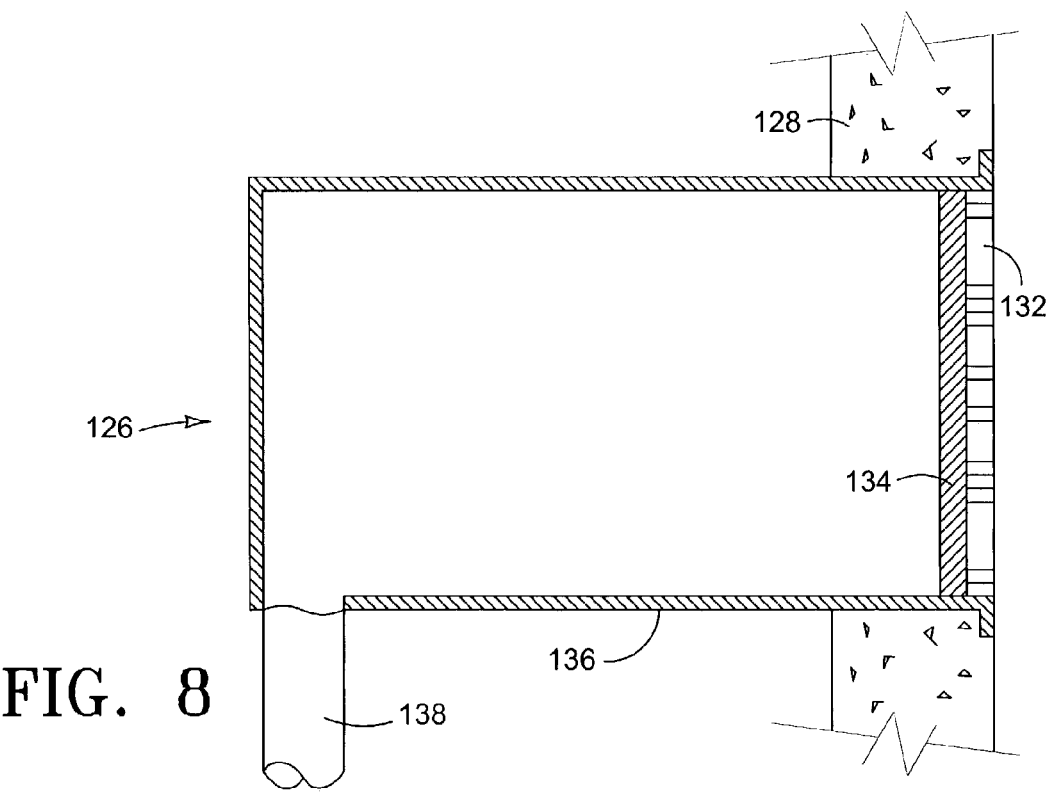
FIG. 8 is an end elevation, sectional view of the component of the liquid extraction system depicted in FIG. 7.

Turning now to FIG. 7, a side elevation view of the intermediate liquid outlet 126 is depicted. The intermediate liquid outlet 126 is provided with a grating or screen 132 to inhibit the migration of the solids into the liquid outlet. Turning to FIG. 8, an end sectional view of the intermediate liquid outlet 126 is depicted. The intermediate liquid outlet 126 includes the screen 132, and a liquid outlet conduit 136, both of which are supported by the sidewall 128. A filter 134 can be provided proximate to the screen 132 and within the liquid outlet conduit 136 to further facilitate the removal of solids along with the liquid from the interior volume 101 of the vessel 100 (FIG. 4). It will be noted that both the filter 134 and the screen 132 can be cleaned of solids which may become trapped thereby by reverse flowing liquid through the liquid outlet conduit 136. It will also be appreciated that liquid outlets located proximate to, and/or in the bottom 180, of the reaction vessel can be configured similarly to the liquid outlet 126 depicted in FIG. 8. Further, sidewall 130 can also contain similarly configured liquid outlets 126.

Figure 9:
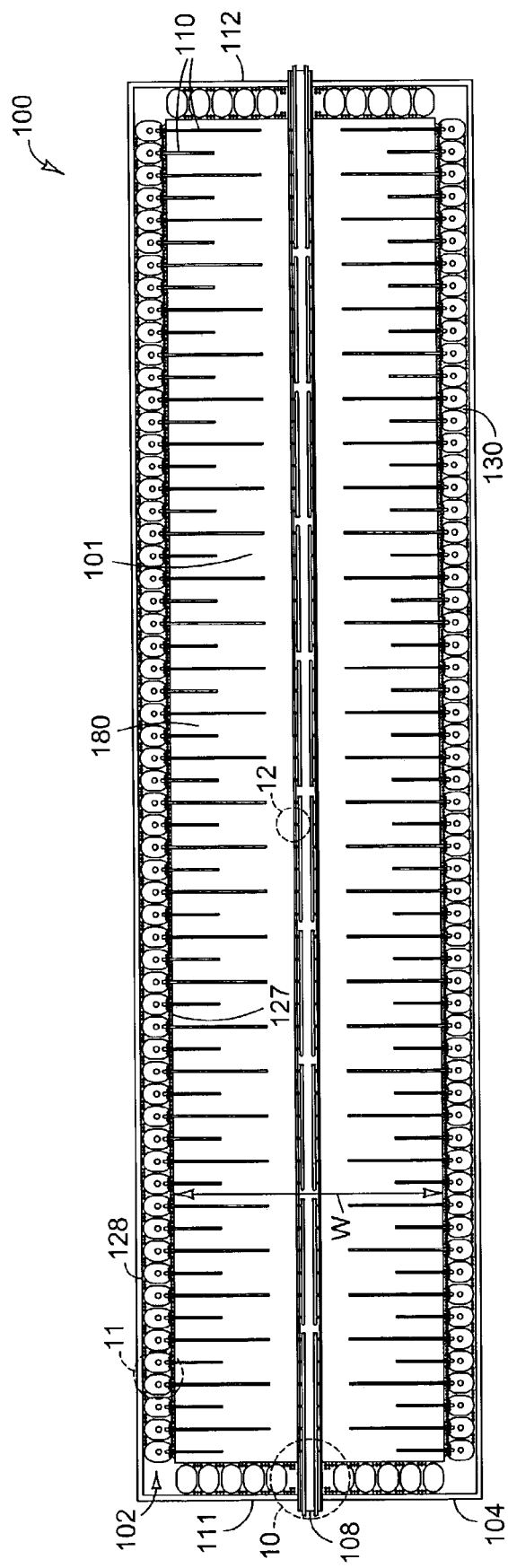
FIG. 9 is a plan, sectional view of the reaction vessel depicted in FIGS. 1–3.

Turning now to FIG. 9, a plan sectional view of the reaction vessel 100 of FIG. 2 is depicted. As can be seen, the perimeter wall 102 is depicted as being a honeycomb hollow-wall type wall defining a plurality of adjacent, vertically oriented shafts (described in FIGS. 10 and 11 below) disposed therein. While the perimeter wall 102 of the reaction vessel 100 can be formed using known forming and casting methods and apparatus, the perimeter wall can also be formed in the honeycomb hollow-wall type wall structure depicted in FIG. 9 using the apparatus described in U.S. patent application Ser. No. 10/131,838 entitled, "Methods and Apparatus for Forming Concrete Structures", and/or U.S. patent application Ser. No. 10/166,406, entitled, "Methods And Apparatus For Building Tall Vertical Structures", both of which are hereby incorporated herein by reference in their entirety.

Turning to FIG. 10, a detail plan view of a portion of the endwall 111 of FIG. 9 is depicted. As can be seen, the honeycomb structure of the perimeter wall 102 defines a plurality of adjacent, vertically oriented shafts 140 disposed therein. The openings or shafts 140 can be sealed towards the bottom of the opening by a diaphragm 146. The perimeter wall 102 can further include a plurality of vertically oriented post-tensioning conduits and tendons 142. FIG. 11 is a detail plan view of a portion of the sidewall 128 of FIG. 9. Vertical open shafts 140, defined by the honeycomb structure of the wall 128, as well as diaphragm 146 and the post-tensioning ducts and tendons 142, are depicted. The sidewall 128 defines therein a plurality of solids extraction openings 125 which, as will be described below with respect to FIG. 13, are arranged in a row (or rows) proximate the bottom 180 of the reaction vessel 100. As can be seen in FIG. 11, certain of the solids extraction outlet openings 125 are open to the interior volume 101 of the reaction vessel 100 immediately adjacent the interior surface 127 of the sidewall 128, and drain into solids extraction conduits 144. Liquid extraction conduits 136 can be placed in liquid communication with the solids extraction conduits 144 to extract additional liquid from solids being extracted via the solids extraction conduits 144. As seen in FIGS. 9 and 11, other periodic ones of the solids extraction openings 125 are connected to solids extraction conduits 110, which extend away from the interior wall surface 127 and into the interior volume 101 of the reaction vessel. As can also be seen in FIG. 9, the length of the solids extraction conduits 110 are staggered in length. Accordingly, by providing multiple points across the width ("W", FIG. 13) and length ("L", FIG. 4) of the reaction vessel 100 where the solids can be extracted (i.e., immediately at the sidewall 128, and at multiple locations away from the sidewall), solids can be extracted across the width "W" and length "L" of the interior volume 101 of the reaction vessel 100. It will be appreciated that an arrangement of solids extraction openings 125 and solids extraction conduits 110, similar to those depicted in FIG. 11 for sidewall 128, can also be provided for sidewall 130, as indicated in FIG. 9.

Turning now to FIG. 13, an end sectional view of the reaction vessel 100 of FIG. 3 is depicted. Sidewalls 128 and 130 define an interior width "W" of the reaction vessel 100. The reaction vessel 100 includes the bottom 180, which is depicted here as being in an inverted "V" shape, with the vertex 105 of the inverted "V" shape being oriented towards the center of the interior volume 101 (along the width "W") of the vessel 100. The perimeter walls 111, 112, 128 and 130 are capped by a diaphragm 131, which can contain post-tensioning ducts and tendons 142 to hold the entire perimeter wall 102 together. The diaphragm 131 defines an upper edge 103 to the perimeter wall 102. The distance between the upper perimeter edge 103 of the perimeter wall 102, and the high point of the bottom 180 (here, the vertex 105) will be termed the "depth" ("D") of the interior volume 101 of the reaction vessel 100. The components 106 and 108 of the liquid supply system (described above) are seen in end view in FIG. 13. The intermediate liquid supply system 108 includes upper and lower casings 120a, 120b, which are supported by stanchions 178 above the bottom 180, but below the upper perimeter edge 103 of the reaction vessel 100. The interior volume 101 of the reaction vessel 100 defines an "effective height" ("H"), which is the distance between the high-point of the bottom 180 (here, the vertex 105) and the height to which liquid and/or solids will typically be filled in the interior volume 101, which is indicated here by the "liquid level" line "LL". As indicated earlier, in operation the solids will typically be covered by the liquid, such that a "solids level" ("SL") is also established in the interior volume 101 of the reaction vessel 100 during operation. However, there can be instances where the liquid does not entirely cover the solids. For example, the instance where a "lid" of non-submerged solids can be used above the liquid level to provide cooler material with which to condense steam as it is given off of the liquid level in the case of certain reactions between liquids and solids being exothermic (e.g. oxidation of sulfides). As can also be seen in FIG. 13, the solids extraction conduits 110 extend along the bottom 180 reaction vessel away from the sidewalls 128, 130 and towards the apex 105 of the bottom 180.

FIG. 13 also depicts liquid extraction openings 126 being located at three vertical positions (heights) along each of the sidewalls 128, 130 (although they can be located at a fewer, or greater, number of locations). The uppermost liquid extraction openings 126 are in communication with first liquid extraction conduits 136a, while the intermediate (middle) and lowermost (proximate the bottom 180) liquid extraction openings 126 are in communication with respective second and third liquid extraction conduits 136b and 136c (respectively). The liquid extraction conduits 136a and 136b are thus intermediate liquid extraction conduits, in communication with the intermediate liquid outlet openings 126 (i.e., those openings above the lowermost openings 126 located proximate the bottom 180 of the reaction vessel 100). The perimeter wall 102 is defined by a lower interior edge 113, and, in the example depicted in FIG. 13, the uppermost liquid outlet openings 126 are located at least a third of the effective height "H" from the lower interior edge 113. While the liquid outlet openings 126 are depicted as being aligned in three rows along the sidewalls 128 and 130, they can also be staggered in their positions along the depth "D" of the sidewalls 128, 130. Access ladders 156 can be provided in the openings 140 defined by the sidewalls 128 and 130 to allow service personnel to access the liquid extraction conduits 136a, 136b to allow cleaning of the filters 134 (FIG. 8) and the like.

Figure 15:
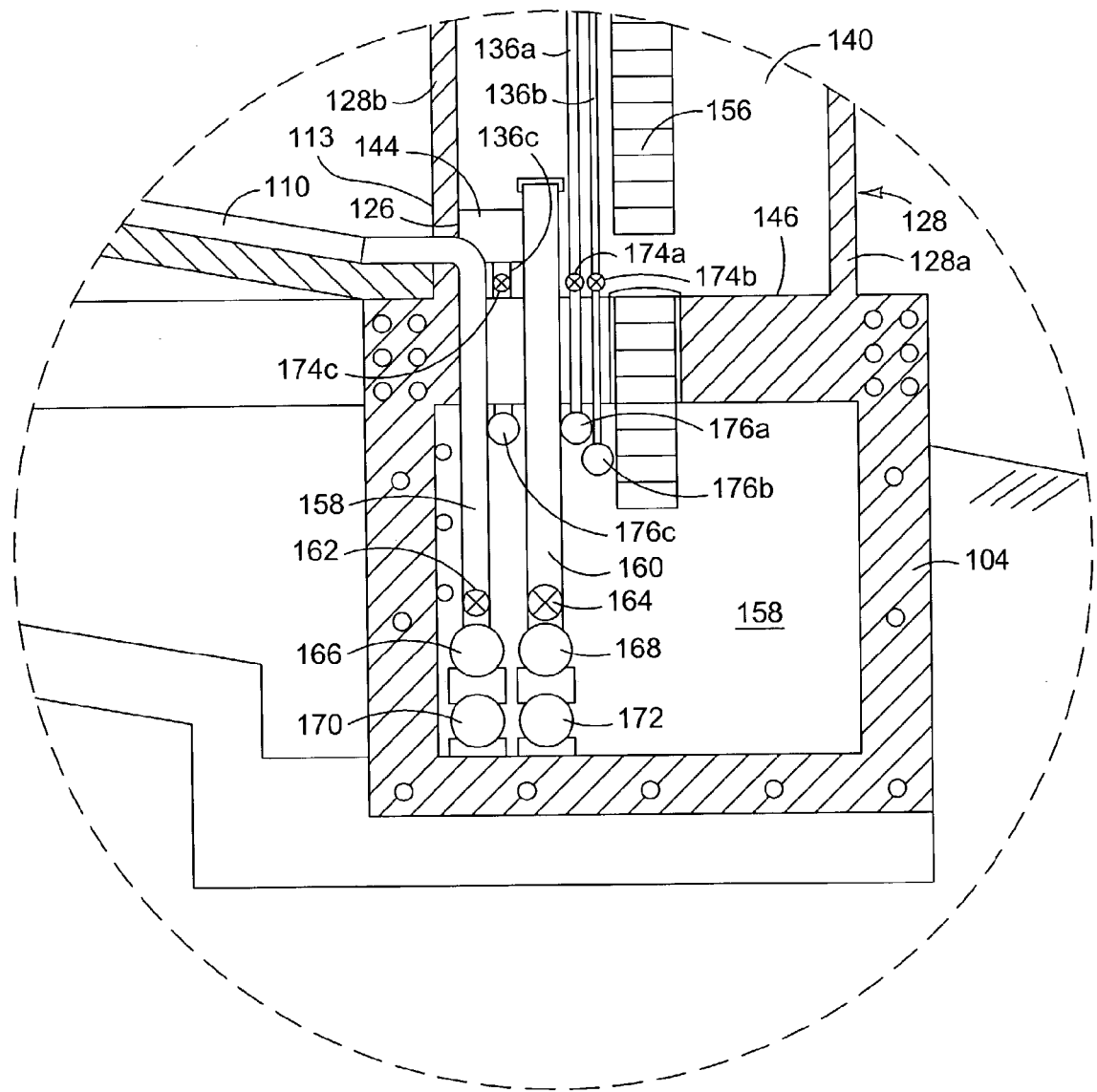
FIG. 15 is a detail diagram of components of the liquid extraction system, and a solids extraction systems, depicted in FIG. 13.

Turning to FIG. 15, an end sectional view depicts the lower right corner of the reaction vessel 100 shown in FIG. 13. The sidewall 128 is defined by outer wall panel 128a and interior or inner wall panel 128b, which together define the opening 140. The liquid extraction conduits 136a and 136b drain liquid from the vessel volume 101 to respective liquid extraction trunk lines 176a and 176b. The liquid extraction conduits 136c, which drain liquid from the solids extraction conduits 144 (see FIG. 11) drain liquid to liquid extraction trunk line 176c. It will thus be appreciated that the openings 125, (FIG. 11) which communicate with the solids conduits 144 proximate the bottom 180, can function both as solids outlet openings and liquid outlet openings. Liquid extraction control valves 174a, 174b and 174c can be placed in respective liquid extraction conduits 136a, 136b and 136c to control the rate at which liquid is extracted from the interior 101 of the reaction vessel 100 at each of the liquid extraction openings 126. The solids extraction conduits 144 extract solids via secondary solids extraction conduits 160 into solids extraction trunk lines 168 and 172, while the solids extraction conduits 110 extract solids from the vessel volume 101 via secondary solids extraction conduits 158 into solids extraction trunk lines 166 and 170. Although not visible in FIG. 15, alternating ones of the solids extraction openings 125 which are located immediately adjacent the inner wall 128b can be routed to solids extraction trunk line 168, while the other solids extraction openings 125, which are located immediately adjacent the inner wall 128b, can be routed to solids extraction trunk line 172. Likewise, the solids extraction openings 125 which are associated with the shorter of the solids extraction conduits 110 (FIG. 9) can be routed to solids extraction trunk line 166, while the solids extraction openings 125 which are associated with the longer of the solids extraction conduits 110 (FIG. 9) can be routed to solids extraction trunk line 170. Solids extraction control valves 162 and 164 can be placed in respective secondary solids extraction conduits 158 and 160 to control the rate at which solids are extracted from the interior volume 101 of the reaction vessel 100 at each of the solids extraction openings 125 (FIG. 11). The foundation 104 defines an access tunnel 158 therein, allowing service personnel to access the solids control valves 162, 164, as well as other equipment located in the tunnel.

Figure 16:
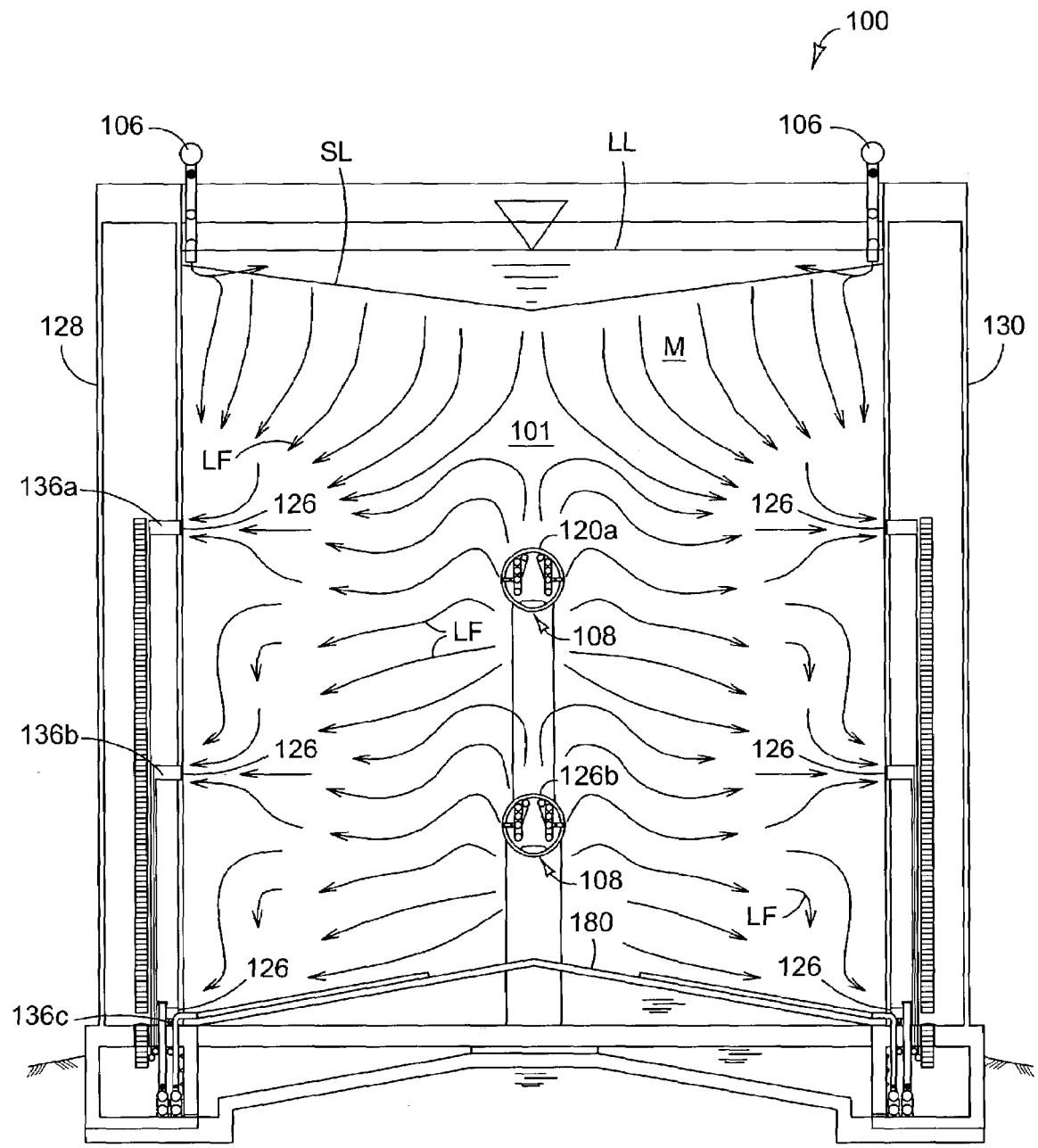
FIG. 16 is an end elevation, sectional view of the reaction vessel depicted in FIGS. 1–3, depicting flow of liquid within the reaction vessel.

Variations on the reaction vessel 100 depicted in FIGS. 1–15 will be described below. However, it is useful at this point to provide an example of how the reaction vessel 100 can be used to react a solid (or solids) with a liquid. As described above, the solids can be added to the interior volume 101 (FIG. 13) of the reaction vessel 100 towards the upper perimeter edge 103 via conveyors or the like, and the liquid can be added to the interior volume 101 using the liquid supply system (including liquid supply components 106 and 108). The solids are extracted from the interior volume 101 of the reaction vessel 100 using the solids extraction system, which, as depicted in the figures described above, includes at least the solids outlet openings 125 defined in the perimeter wall 102, and solids extraction conduits 110, 144, 158, and 160. The liquid is extracted from the interior volume 101 of the reaction vessel 100 using the liquid extraction system, which, as depicted in the figures described above, includes at least the liquid outlet openings 126 defined in the perimeter wall 102, and the liquid extraction conduits 136a–c. As also described previously, the typical mode of operation of the reaction vessel is a continuous mode, such that the reacted solids and liquids are removed from the interior volume 101 of the vessel 100 at approximately the same rate as "fresh" (i.e., unreacted) solids and liquid are added to the interior volume of the vessel, LL and SL being held fairly constant. One example of an operation of the reaction vessel 100 is depicted in the sectional end views of vessel 100 in FIGS. 16 and 17. FIG. 16 depicts the mixture "M" of the solids and the liquid, which is defined at the top of the mixture by a "solids line" ("SL"), and above which a "liquid line" ("LL") is present. Between the solids line "SL" and the liquid line "LL", the mixture will typically be mostly liquid. The flow of the liquid from the liquid supply system (106, 108) to the liquid outlet openings 126 is identified by the liquid flow lines "LF". It will be appreciated that as the liquid flows in the directions indicated by the liquid flow lines "LF", the solids will be affected chemically by the liquid flowing through the solids, and will move downwardly in the reaction vessel 100 (as will be described with respect to FIG. 17). Typically, the liquid moves downward, but can, in some applications, be made to also flow toward the sidewalls 128, 130 through ports 126 within the reaction vessel 100.

Figure 17:
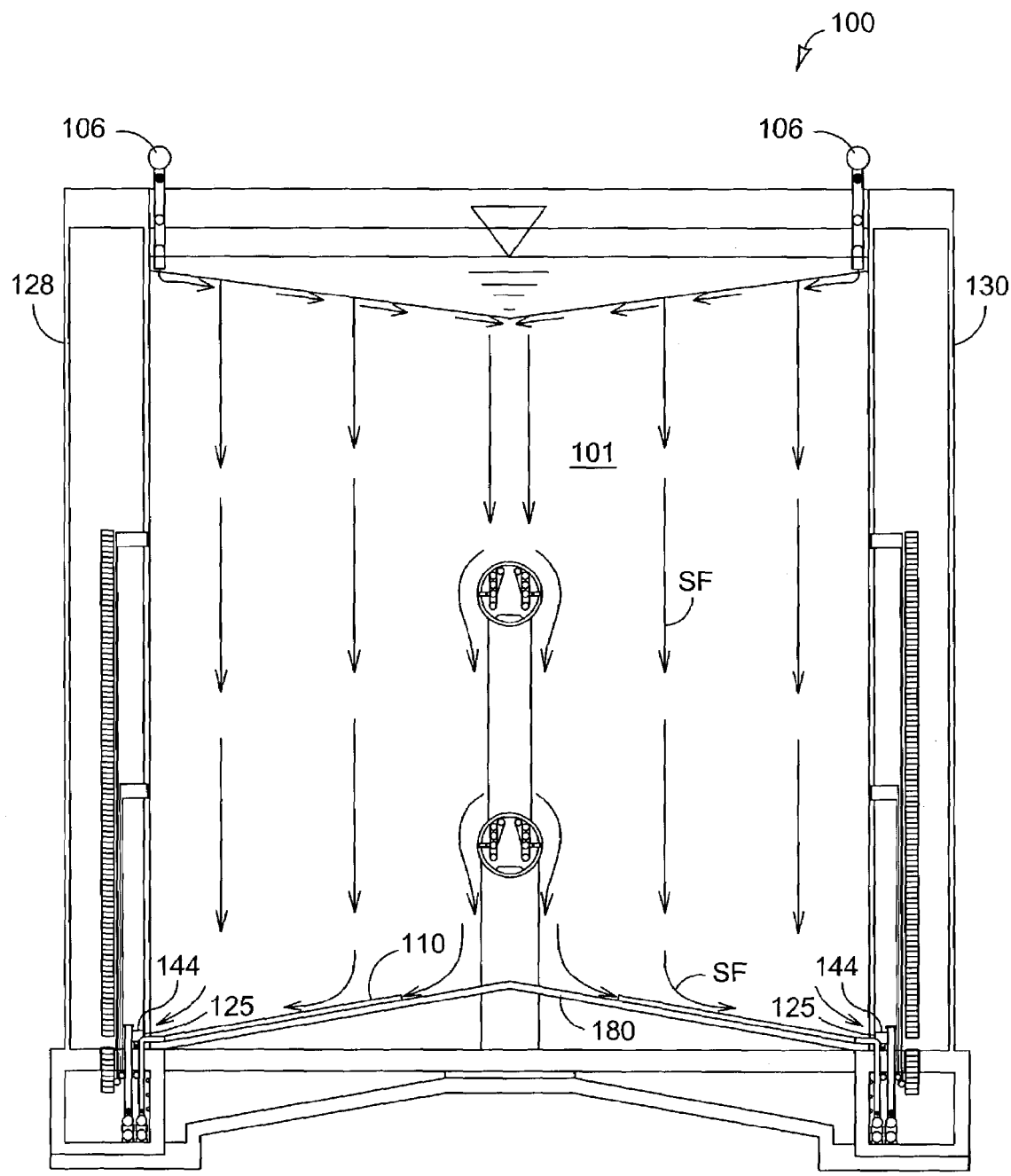
FIG. 17 is an end elevation, sectional view of the reaction vessel depicted in FIGS. 1–3, depicting flow of solids within the reaction vessel.

Turning to FIG. 17, the movement of the solids within the reaction vessel 100 of FIG. 16 is depicted. The solids tend to move in the directions indicated by the "solids flow" lines "SF", which is generally downward within the interior volume 101 of the reaction vessel 100, and then across the region proximate the bottom 180 of the reaction vessel. Some of the solids will be swept into the solids extraction conduit extensions 110 (see FIG. 9) which are in communication with selected ones of the solids outlets 125, while other of the solids will be swept towards the sidewalls 128, 130 and directly into the solids outlets 125 that open directly into the interior volume 101 at the sidewalls (128, 130). Comparing FIG. 16 (liquid flow within the reaction vessel 100) to FIG. 17 (solids flow within the reaction vessel), it will be appreciated that the liquid and the solids do not move in exactly the same directions at all regions within the reaction vessel 100. It will also be appreciated that the liquids and solids typically flow at different rates to effect the desired reaction rates between the solids and the liquids. In special cases the liquid supply system, and the liquid extraction system, provide a substantial center-to-sidewall flow vector for the liquid throughout the effective height "H" (FIG. 13) of the reaction vessel 100 (see FIG. 16), whereas the solids extraction system provides for primarily downward movement of the solids within the reaction vessel 100, until the solids approach the bottom 180. This difference in movement of the liquid and the solids within the reaction vessel 100 produces the beneficial effect of allowing the solids to be removed from the reaction vessel through the use of gravity and liquid flow alone, without the need for a mechanically intervening solids extraction system (such as an auger or the like), and without the need to continually agitate the contents (i.e., the liquid/solids mixture) within the reaction vessel. Specifically, we have discovered that the flow of liquid indicated in FIG. 16 produces a differential shear stress on the solids particles, enhancing the migration of the solids towards the bottom 180 of the reaction vessel in a mass flow, and then out through the solids outlet openings 125.

Accordingly, an embodiment of the present invention provides for a liquids/solids reaction vessel (exemplarily, but not limited to vessel 100 of FIGS. 1–15) configured to contain a mixture of at least one liquid and at least one solid. The vessel includes a closed perimeter wall (e.g., wall 102 of FIG. 2) defined by an effective height (e.g., effective height "H" of FIG. 13), and a bottom (e.g., bottom 180, FIG. 13) connected to the closed perimeter wall, to thereby define a vessel volume (e.g., 101, FIG. 13) configured to contain the mixture of solids and liquid. The reaction vessel further includes a solids extraction system located in at least one of the bottom or in the perimeter wall proximate the bottom. One example of a solids extraction system is the solids outlets 125 (FIG. 11) defined in the perimeter wall 102, and the solids extraction conduits (110, 144, 158, 160, FIG. 15). In the reaction vessel, the effective height (e.g., "H", FIG. 13) of the perimeter wall (e.g., 102, FIG. 13) is selected to produce a pressure proximate the bottom of the reaction vessel (e.g., proximate the bottom 180, FIG. 13) selected to eject the solids through the solids extraction system under the influence of gravity alone. The effective height can further be selected to cause an initiation of a reaction, or an increase in a reaction rate, between the at least one liquid and the at least one solid. In another variation the effective height is not selected to cause an initiation of a reaction, or an increase in a reaction rate, between the at least one liquid and the at least one solid—that is, the vessel does not act as a "reaction vessel", but merely a vessel for allowing solids and liquids to contact one another, and allow the solids and the liquids to be extracted, or flow out of, the solids removal system under the influence of gravity alone.

We have found that an effective height (e.g., "H", FIG. 13) of at least 20 meters, and more preferably (but not necessarily) 30 meters, is in most commercially practicable cases sufficient to produce the desired effect of ejecting the solids through the solids extraction system under the influence of gravity alone. Further, we have discovered that the desired effects of ejecting the solids under the influence of gravity alone are enhanced when the perimeter wall distance (e.g., the length "L" of FIG. 4, plus the width "W" of FIG. 9, multiplied by two) has a ratio to the effective height "H" (FIG. 13) of about at least 0.5:1. Additionally, we have discovered that when the reaction vessel is in a rectangular shape (as viewed in plan view, and as exemplarily defined by sidewalls (such as sidewalls 128, 130, FIG. 2) and endwalls (such as endwalls 111, 112, FIG. 2)), and when the sidewalls are each defined by an interior sidewall length (e.g., "L", FIG. 4) and the endwalls are each defined by an interior endwall length (e.g., "W", FIG. 13), the desired solids flow (and reaction) characteristics are enhanced when the ratio of the interior sidewall length "L" to the interior endwall length "W" is at least 1:1. Further, we have discovered that the desired solids flow (and reaction) characteristics are enhanced when the ratio of the interior sidewall length (e.g., "L", FIG. 4) to the effective height of the interior volume 101 (e.g., "H", FIG. 13) is greater than about 0.15:1. Moreover, we have discovered that the desired solids flow (and reaction) characteristics are enhanced when the ratio of the interior endwall length (e.g., "W", FIG. 13) to the effective height (e.g., "H", FIG. 13) is less than about 1.5:1. Additionally, we have discovered that the desired solids flow characteristics (and liquid/solids reaction characteristics) are enhanced when the ratio of the upper edge interior perimeter (e.g., the length "L" of FIG. 4, plus the width "W" of FIG. 9, multiplied by two), to the effective height (e.g., "H", FIG. 13) is not greater than about 1.1:1.

Figure 18:
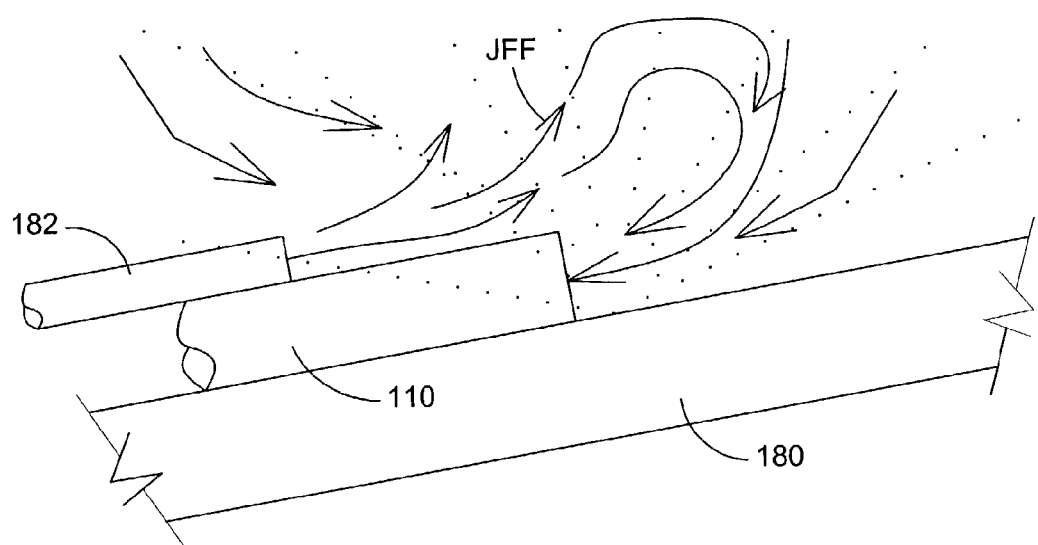
FIG. 18 is an end view, detail diagram, depicting alternate components of a solids extraction system than can be used in the reaction vessel depicted in FIGS. 1–3.

Turning now to FIG. 18, a modification to the reaction vessel 100 of FIGS. 1–17 is depicted in a partial end sectional view. As depicted in FIG. 18, the reaction vessel (unnumbered) further includes a jetting system oriented proximate the bottom 180 of the vessel and configured to introduce a jetting fluid into the reaction vessel. Specifically, the jetting system includes a jetting fluid conduit 182 which is placed adjacent to or, as depicted, above the solids extraction conduit 110. The jetting fluid creates a fluid flow indicated by jetting fluid flow lines "JFF", which facilitate migration of the solids into the solids extraction conduit 110. The jetting fluid can be a gas or a liquid, and can also be the same fluid as is placed in the reaction vessel 100 with the solids.

Figure 19:
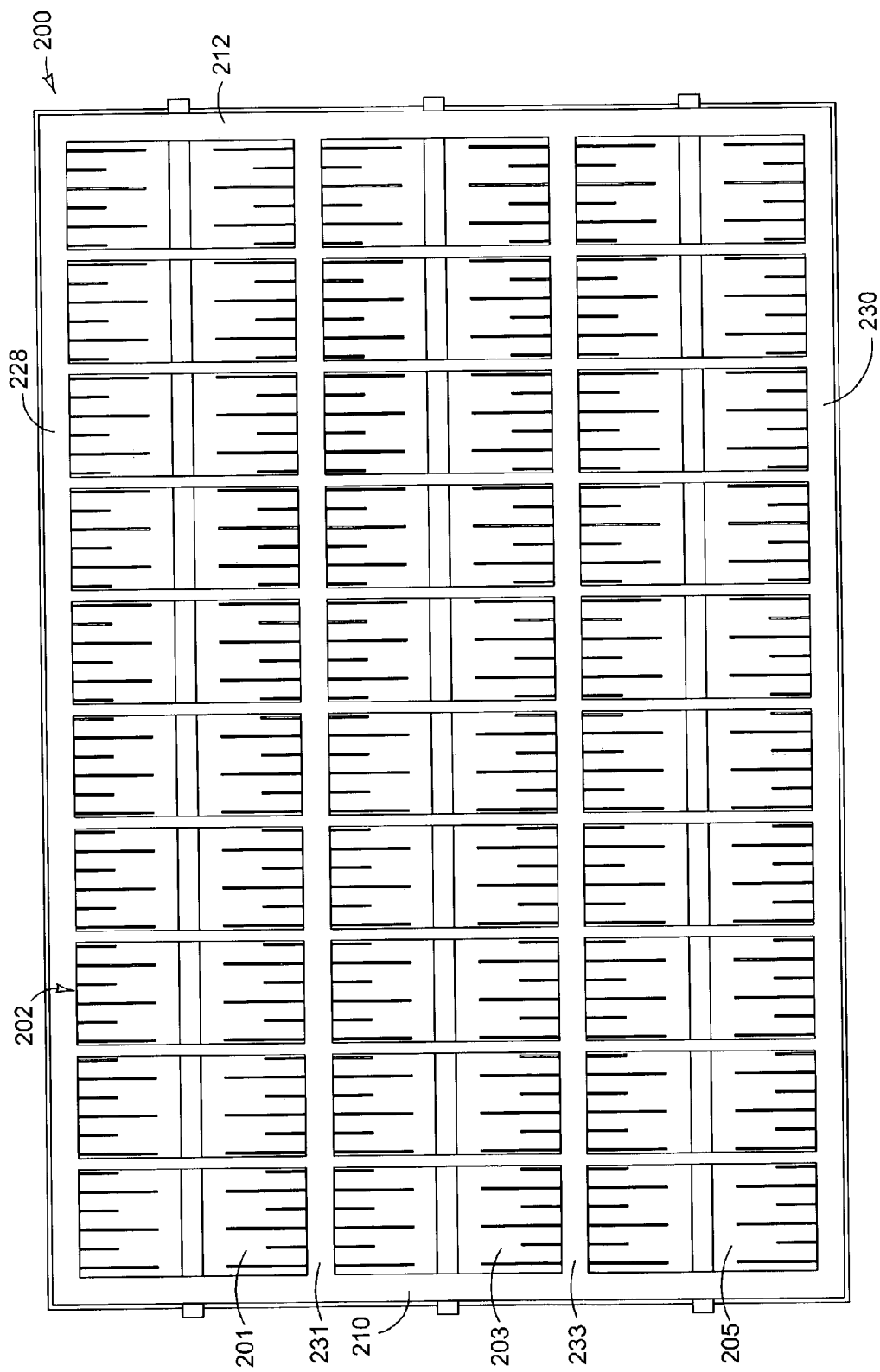
FIG. 19 is a plan view of an alternative configuration depicting a liquids/solids reaction vessel in accordance with an embodiment of the present invention.

Turning now to FIG. 19, a variation on the embodiment of the invention described in FIGS. 1–15 is depicted in plan view. FIG. 19 depicts a plan view of a reaction vessel 200 that is defined by a continuous perimeter wall 202. The perimeter wall 202 includes two generally parallel sidewalls (228, 230), and two generally parallel endwalls (210, 212) which are connected to the sidewalls to thereby form a generally rectangular form of the perimeter wall (202) when viewed in a plan view. The reaction vessel 200 further includes intermediate sidewalls 231 and 233, which are spaced apart from one another, and located between, and spaced apart from, the sidewalls 228 and 230. The sidewalls 228, 230, the endwalls 210, 212, and the intermediate walls 231, 233 together define three separate interior volumes 201, 203, and 205, each of which can function similarly to the interior volume 101 of the reaction vessel 100 of FIGS. 1–17, and each of which can include a solids extraction system, a fluid extraction system, and a fluid supply system, (unnumbered), as described above with respect to the reaction vessel 100. However, it will be appreciated that certain aspects of each of these systems (solids extraction system, fluid extraction system, and fluid supply system) can be shared between adjacent interior volumes 201, 203, and 205. While the reaction vessel 200 of FIG. 19 depicts three interior volumes (201, 203, 205) in adjacent arrangement, it will be appreciated that the same arrangement can be used to define two interior volumes, or more than three interior volumes, all in adjacent alignment. Further, while the interior volumes (201, 203, 205) are depicted as being arranged in side-by-side alignment, it will be appreciated that multiple reaction vessels according to vessel 100 (FIGS. 1–17) can be arranged in end-to-end alignment, and well as side-by-side and end-to-end alignment, to thereby provide a plurality of reaction vessel interior volumes. In this way a large volume of solids (and liquids) can be simultaneously reacted with one another, and common walls (231, 233) can be used to share liquids and solids handling equipment with one another (e.g., liquid and/or solids extraction components such as control valves and conduits).

Figure 20:
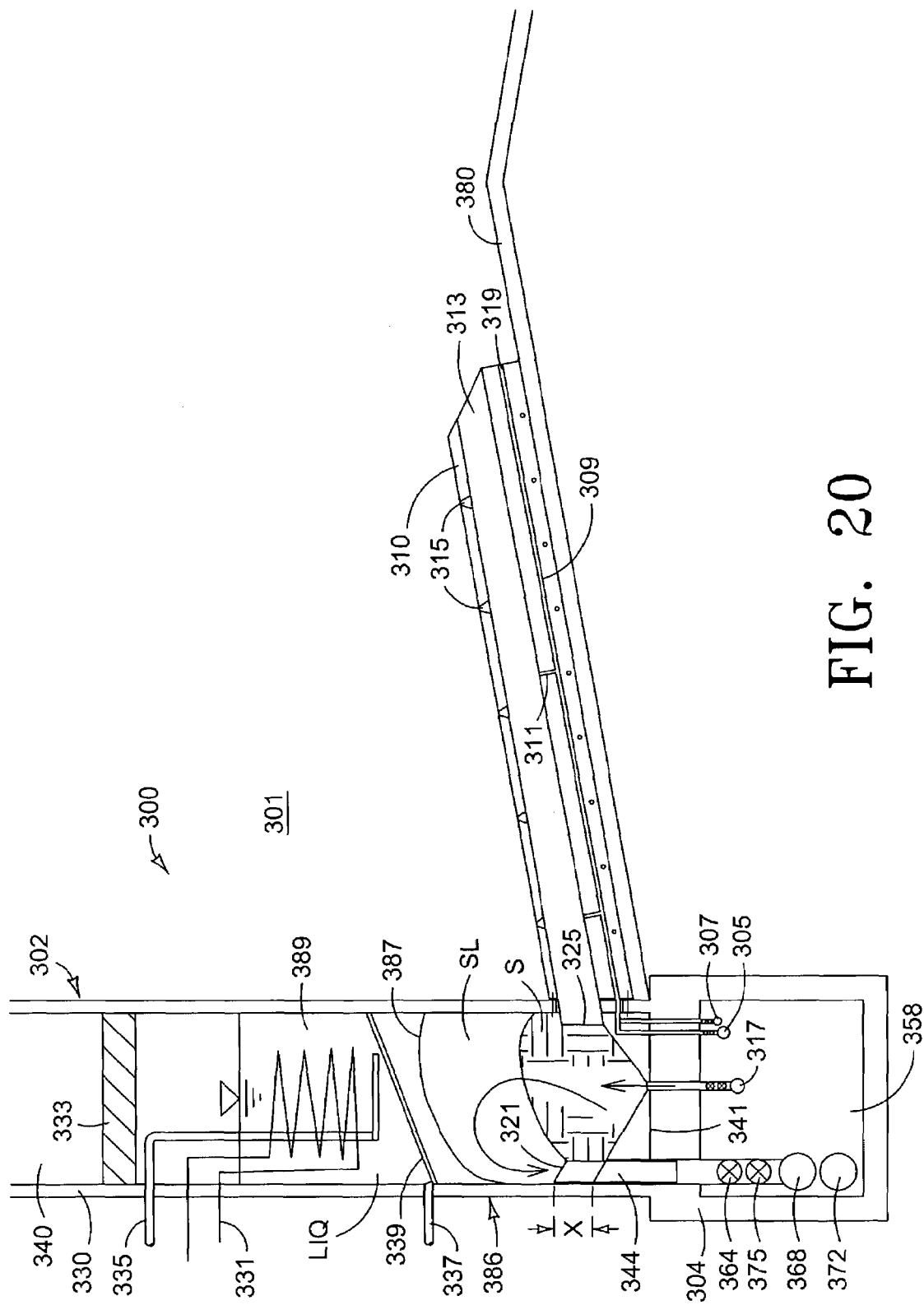
FIG. 20 is an end elevation, sectional view depicting alternate components of a solids extraction system that can be used in a reaction vessel in accordance with embodiments of the present invention.

Turning now to FIG. 20, a variation on the liquid and solids extraction system shown in FIGS. 1–15 is depicted in a partial end elevation sectional view. The reaction vessel 300 of FIG. 20 includes a sidewall 330, which is similar to sidewall 130 of FIG. 13. Specifically, sidewall 330 is a honeycomb hollow-wall type wall defining a plurality of adjacent, vertically oriented shafts 340 (only one of which can be seen in FIG. 20) disposed therein. The reaction vessel 300 further induces additional wall members (not shown) to define a closed perimeter wall 302, similar to the structure depicted for reaction vessel 100 of FIG. 1. In the reaction vessel 300 of FIG. 20, the solids extraction conduits 110 of the reaction vessel 100 (FIG. 13) have been replaced with a plurality of solids extraction tunnel members 310 (only one of which is shown in FIG. 20), each of which define solids extraction tunnels 313 in communication with associated ones of the solids outlets 325. As depicted in FIG. 20, the solids extraction tunnel members 310 extend from the sidewall 330 (and any other sidewall or sidewalls) along the bottom 380. As also depicted in FIG. 20, the solids extraction tunnel members 310 further define a plurality of liquid outlet openings 315 therein to allow liquid in the interior volume 301 of the reaction vessel 300 to enter the solids extraction tunnels 313, thus facilitating movement of the solids out of the interior volume 301 and through the extraction tunnels 313. Optionally, each of the solids extraction tunnel members 310 can include a jetting system configured to introduce a jetting fluid into the solids extraction tunnels 313. As depicted in FIG. 20, the jetting system includes a jetting fluid conduit 305 which feeds (1) a jetting channel 309 defined in the lower part of the tunnel member 310, (2) jetting fluid ports 311 within the tunnel 313, and (3) a jetting fluid port 319 at the end of the tunnel member 310. The use of a jetting fluid can facilitate movement of solids into the tunnel 313, and along the tunnel into the solids extraction outlet openings 325. In addition to the jetting fluid supply conduit 305, the jetting system can include a second jetting fluid supply conduit 307. For example, the first jetting fluid supply conduit 305 can provide the same liquid as is in the reaction vessel 300 as a jetting liquid, and the second jetting fluid supply conduit 307 can provide a gas as a jetting gas.

A further modification to the solids extraction system of the reaction vessel 100 (FIGS. 1–15) which is present in the reaction vessel 300 (FIG. 20) is the use of a plurality of solids flow control vessels in communication with at least some of the solids extraction conduits or tunnel members 310. In FIG. 20, the solids flow control vessels (only one of which can be seen) are defined by the vertically oriented shafts 340 in the sidewalls 330. Specifically, a region 386 in the bottom of the shaft 340 defines the solids flow control vessel. Solids passing from the tunnel 313 and the solids outlet opening 325 pass into the solids flow control vessel 386. The solids flow control vessel 386 includes a standpipe 344 which defines a solids vessel outlet 321. The solids vessel outlet 321 is thus raised above the bottom 341 of the solids flow control vessel 386, thus allowing solids "S" to accumulate in the lower part of the solids flow control vessel 386. Each solids flow control vessel 386 can further include a jetting system 317 oriented in or proximate to the vessel bottom 341. The jetting system 317 is configured to inject a jetting fluid into the solids flow control vessel 386. As the jetting fluid is injected into the solids flow control vessel 386, the jetting fluid facilitates movement of the solids "S" towards the solids vessel outlet 321. When jetting fluid is injected at a fairly rapid rate, then a slurry zone "SL" can be formed above the solids "S", further facilitating movement of the solids "S" towards the solids vessel outlet 321.

The solids extraction standpipe 344 is connected to a solids extraction manifold 343, which is in turn connected to solids extraction trunk lines 368 and 372. The solids extraction manifold 343 and solids extraction trunk lines 368 and 372 can be located in an access tunnel 358 defined in the foundation 304. It will be recalled that the reaction vessel 300 includes a plurality of the solids extraction tunnel members 310 distributed across the bottom 380 of the vessel 300 (similar to the solids extraction conduits 110 depicted in FIG. 1). Accordingly, alternating ones of the standpipes 344 associated with alternating ones of the tunnel members 310 can be connected to solids trunk line 368, while the other standpipes 344 can be connected to solids trunk line 372. The solids extraction manifold 343 can further include a solids flow control valve 375 and a solids flow shut-off valve 364. The solids flow control valve 375 can be used to control the rate at which solids are allowed to flow out of the solids vessel outlet 321, which in turn controls the rate at which solids can flow out of the interior volume 301 of the reaction vessel 300. For example, one of the liquid or the solids removed at the standpipe can be sampled (assayed) to determine if the desired reaction between the two has sufficiently completed to justify removing the liquid and/or the solids from the bottom of the reaction vessel 300. If the assay determines that an insufficient amount of reaction has occurred, then the rate at which the solids are being extracted from the interior volume 301 of the reaction vessel 300 can be slowed using the solids flow control valve 375. The solids flow shut-off valve 364 can be used to completely isolate the standpipe from the solids trunk lines 368, 372.

The solids flow control vessel 386 can be further defined within the shaft 340 by an upper bulkhead 333. A screen 339 can be placed in the solids flow control vessel 386 between the bottom 341 and the bulkhead 333 to isolate a solids-containing region 387 in the lower part of the vessel 386 from a fluids-containing region 389 above the screen 339. A heat exchanger 331 can be provided in the fluids-containing region 389 to heat or cool liquid "LIQ" which is in contact with the solids in the solids-containing region 387. For example, if the reaction between the solids and the liquid in the reaction vessel 300 is an exothermic reaction, then the heat exchanger can be used to cool the liquid. Further, the solids flow control vessel 386 can function as a secondary reaction vessel and/or a treating vessel. For example, the heat exchanger can add heat to the liquid "LIQ" to accelerate a reaction between the solids and the liquid. Additionally, a treatment line 335 can be provided to allow treating chemicals (such as catalysts, acids, buffers, etc.) to be injected into the liquid "LIQ".

Figure 21:
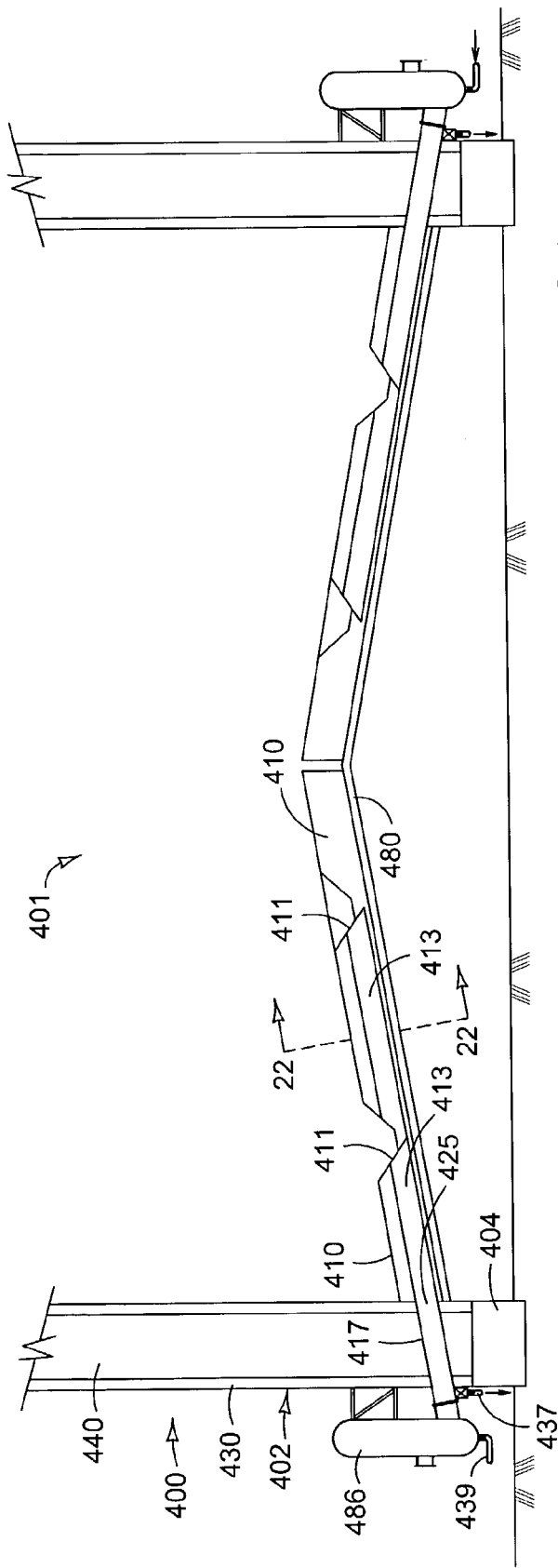
FIG. 21 is an end elevation, sectional view depicting further alternate components of a solids extraction system that can be used in a reaction vessel in accordance with embodiments of the present invention.

Turning now to FIG. 21, a partial end elevation sectional view of a reaction vessel 400 in accordance with another variation of the invention is depicted. FIG. 21 depicts generally the same region of the reaction vessel 300 as is depicted in FIG. 20. The reaction vessel 400 of FIG. 21 includes a sidewall 430, and additional wall members (not shown) to form a closed perimeter wall 402 (similar to wall 102 of FIG. 1), which, along with the bottom 480, defines an interior volume 401 of the reaction vessel 400. The reaction vessel 400 is somewhat similar to the reaction vessel 300 (FIG. 20) in that it includes solids extraction tunnel members 410 which are disposed along the bottom 480. As depicted in FIG. 21, the tunnel members 410 can be of different lengths, similar to the solids extraction conduits 110 of FIG. 1. The solids extraction tunnel members 410 define solids inlet openings 411, which lead to solids extraction tunnels 413, which in turn allow solids to be extracted from the interior 401 of the reaction vessel 400 via the solids outlet openings 425. A solids extraction conduit 417 communicates the extracted solids from the solids outlet 425 through the sidewall 430 and into a solids flow control vessel 486 which is exterior of the reaction vessel 400. The solids flow control vessel 486 can include a jetting system 439, and can function similarly to the solids flow control vessel 386 described above with respect to FIG. 20.

Figure 22:
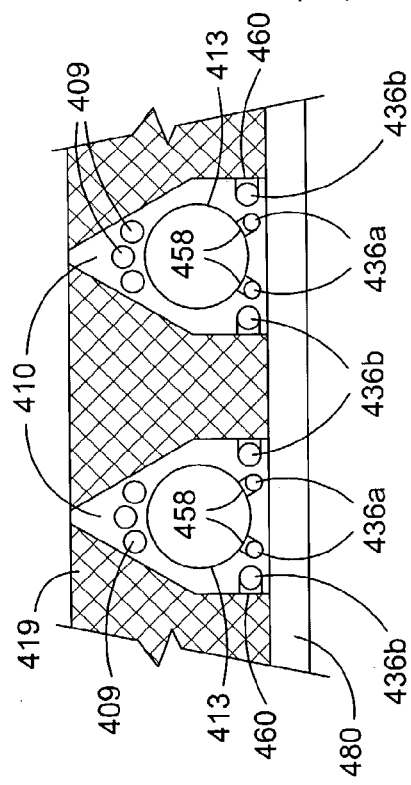
FIG. 22 is a detail diagram depicting components of the solids extraction system depicted in FIG. 21.

The solids extraction tunnel members 410 of FIG. 21 differ somewhat from the tunnel members 310 of FIG. 20. FIG. 22 is a side elevation sectional view of two of the solids extractions tunnel members 410 depicted in FIG. 21. The solids extractions tunnel members 410 each define a solids extraction tunnel 413. Liquid extraction openings 458 allow liquids in the solids extraction tunnels 413 to drain into liquid extraction conduits or channels 436a which are defined within the solids extractions tunnel members 410. Additional liquid outlet (extraction) openings 460 are defined in the sides of the solids extractions tunnel members 410, and allow liquid near the bottom 480 to drain into the additional liquid extraction conduits or channels 436b which are defined within the solids extractions tunnel members 410. A liquid permeable material 419, such as gravel or sand, can be placed over the solids extractions tunnel members 410 to cover the fluid outlet openings 460. In this way solids will be generally filtered from the liquid by the liquid permeable material 419 prior to the liquid entering the liquid extraction conduits 436b. Liquid can be drained from the liquid extraction conduits 436a, 436b via the liquid extraction conduit 437 (FIG. 21). The solids extractions tunnel members 410 can also define jetting conduits 409 which can function similarly to the jetting fluid conduits 309, described above with respect to FIG. 20.

Figure 23:
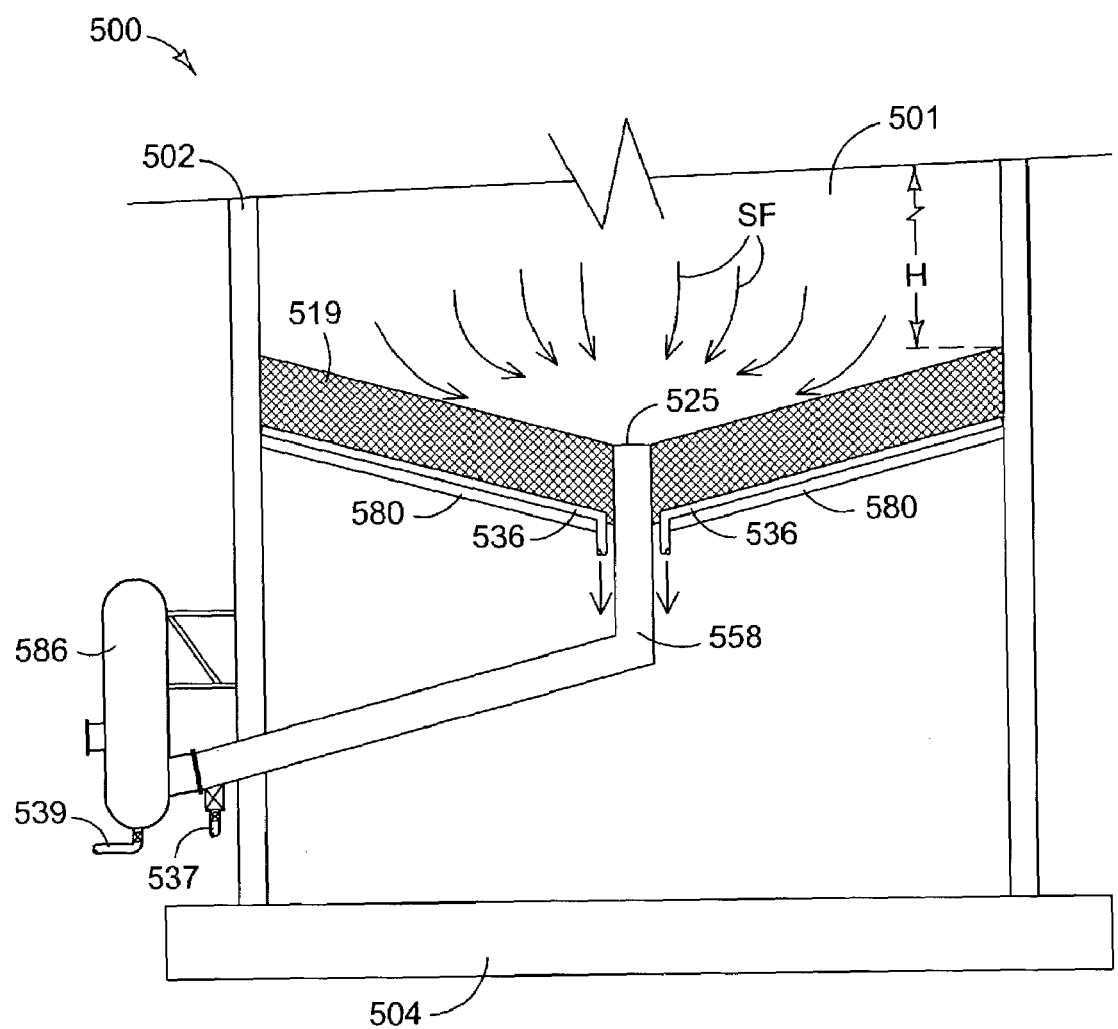
FIG. 23 is a partial side elevation sectional view of a reaction vessel in accordance with yet another embodiment of the present invention.

Turning now to FIG. 23, a reaction vessel 500 in accordance with yet another embodiment of the present invention is depicted in a side elevation partial sectional view. The reaction vessel includes a closed perimeter wall 502 and a bottom 580, which together define an interior volume 501. The interior volume 501 is configured to receive at least one liquid and a least one solid which are to be reacted with one another. In a plan view, the perimeter wall 502 is generally circular in shape. The reaction vessel further includes a solids extraction system (not numbered) and a liquid extraction system (also not numbered), each of which will be described more fully below. The reaction vessel 500 is depicted in FIG. 23 in a truncated view, but it will be appreciated that the perimeter wall 502 is defined by an effective height "H", which is selected to produce a pressure proximate the bottom 580 of the reaction vessel 500 selected to eject the solids through the solids extraction system under the influence of gravity alone. The effective height "H" can be further selected to cause an increase in a reaction rate, or to initiate a reaction, between the at least one liquid and the at least one solid.

The solids extraction system provided for the reaction vessel 500 includes a solids outlet opening 525 which is defined by a centrally located solids extraction conduit 558. The bottom 580 is generally "V" shaped in cross section to facilitate migration of the solids to the solids outlet opening 525. The flow of the solids towards the solids outlet opening 525 is depicted by solids flow lines "SF". As can be seen, the solids extraction conduit 558 protrudes a distance above the bottom 580. In the example shown in FIG. 23, a liquid-permeable material 519, such as sand or gravel, is placed in the lower part of the reaction vessel 500 between the bottom 580 and the top of the solids extraction conduit 558 (i.e., at the solids outlet opening 525). The liquid extraction system includes a plurality of liquid extraction conduits 536 which are radially disposed about the bottom 580 of the reaction vessel 500. The liquid extraction conduits 536 define liquid outlet openings (not shown) along their lengths, thus allowing liquid that has drained through the liquid-permeable bed 519 to enter the liquid extraction conduits 536, and be removed from the interior volume 501 of the reaction vessel 500. The solids extraction conduit 558 can be placed in communication with a solids flow control vessel 586, which can be provided with a jetting system 539. The solids flow control vessel 586 can be operated similarly to the solids flow control vessel 386, described above with respect to FIG. 20, to allow the rate of extraction of solids from the reaction vessel 500 to be controlled.

A further embodiment of the present invention includes a method of treating solids with a liquid. The method includes providing a vessel (such as reaction vessel 100 (FIGS. 1–15), 200 (FIG. 19), 300 (FIG. 20), 400 (FIG. 21) or 500 (FIG. 23)), and filling the vessel with the solids to a preselected solids depth. In one example the preselected solids depth is at least 24 meters. The method further includes placing the liquid in the vessel to a preselected liquid depth. In the example wherein the preselected solids depth is at least 24 meters, the preselected liquid depth is at least 27 meters, or at least 3 meters above the solids. In another example the preselected solids depth is at least 30 meters, and the preselected liquid depth is not more than 10 meters below the solids. The preselected solids depth and the preselected liquid depth are selected to produce a reaction zone within the vessel. The reaction zone is a region within the interior of the vessel wherein a chemical reaction occurs between the liquid and the solid. That is, the pressure generated by the weight of the liquid and the solids at the reaction zone will be sufficient to initiate a reaction, or accelerate the rate of reaction, between the liquid and the solid. More generally, the vessel is filled with a mixture of the solids and the liquid to an "effective height" (e.g., effective height "H" of FIG. 13) selected to produce a reaction zone sufficient to initiate a reaction, or accelerate the rate of reaction, between the liquid and the solid.

In one example the solids are selected from the group consisting of gold-bearing ore, silver-bearing ore, ore bearing platinum group metals, ore bearing rare earth elements, ore bearing gallium, ore bearing germanium, ore bearing light metals, ore bearing copper, ore bearing zinc, ore bearing uranium, ore bearing cobalt, ore bearing nickel, solids bearing coal, solids bearing tar sands, and solids bearing oil shales. The liquid is then selected from the group consisting of an aqueous solution of acid or acids, an aqueous solution of acid or acids including an oxidizing agent, an aqueous solution of a base or bases, an aqueous solution of a base or bases including an oxidizing agent, an aqueous solution of cyanide including an oxidizing agent, an aqueous solution of ferrous or ferric sulfate, an aqueous solution of ferrous or ferric sulfate including an oxidizing agent, an aqueous solution containing a bacterial catalyst, an aqueous solution of chlorine, and an aqueous solution of air, sulfur dioxide and copper. As can be seen, the method is particularly useful for extracting valuable metals from ores. Moreover, the method can be applied to solids (such as ores) defined by an average particle size (i.e., diameter) of at least about 0.07 mm, but not greater than about 150 mm. More particularly, the method can be applied to solids defined by an average particle size of at least about 0.50 mm, but not greater than about 50 mm.

The method can further include circulating the liquid in the vessel. In one example, the solids are resident within the vessel for a period of not more than 240 hours. In another example, wherein the vessel is defined by a bottom (e.g., bottom 180 of reaction vessel 100, FIG. 13) and an upper perimeter edge (e.g., upper perimeter edge 103, FIG. 13), the liquid is circulated from proximate the upper perimeter edge of the vessel to proximate the bottom of the vessel.

Yet another embodiment of the present invention includes a method of treating solids with a liquid. The method includes providing a vessel (e.g., reaction vessel 100 of FIGS. 1–17) that defines solids outlet openings therein (e.g., solids outlet opening 125, FIG. 11). The method further includes filling the vessel with the solids to a preselected solids depth, placing the liquid in the vessel to a preselected liquid depth, and extracting the solids at the solids outlet openings under the influence of gravity alone. In one example the preselected solids depth is at least 24 meters, and the preselected liquid depth is at least 27 meters, or at least 3 meters above the solids. More generally, the vessel is filled with a mixture of the solids and the liquid to an "effective height" (e.g., effective height "H" of FIG. 13) selected to cause the solids to flow out of the vessel via the solids outlet opening under the influence of gravity alone. In this way separate agitation of the contents in the vessel is not required to enable the solids to be extracted from the vessel, as in the prior art. In one example the solids are extracted from the vessel under the influence of gravity alone along with some of the liquid from the vessel (i.e., as a mixture of the solids and the liquid), and the ratio of the solids to the liquid in the mixture (on a volume basis) is not less than about 1:1. In another example the ratio of the solids to the liquid in the mixture (on a volume basis) extracted from the vessel is not less than about 2:1. In yet a further example the ratio of the solids to the liquid in the mixture (on a volume basis) extracted from the vessel is not less than about 3:1. In still a further example the ratio of the solids to the liquid in the mixture (on a volume basis) extracted from the vessel is not less than about 4:1. In yet another further example the ratio of the solids to the liquid in the mixture (on a volume basis) extracted from the vessel is not less than about 5:1. The method can further include extracting the liquid essentially free of the solids from the vessel under the influence of gravity alone. For example, the liquid can first be filtered through a liquid-permeable material (such as sand or gravel, as depicted in FIGS. 22 and 23) and then collected in gravity drain liquid extraction conduits (such as conduits 536 of FIG. 23).

The method can further include injecting a gas into the vessel at the bottom and/or proximate to the bottom of the vessel. For example, as depicted in FIG. 20, the gas conduit 307 and the jetting conduit 309 can be used to introduce gas into the interior volume 301 of the reaction vessel 300 proximate the bottom 380. Similarly, the method can include injecting a jetting fluid into the vessel at the bottom and/or proximate to the bottom of the vessel to facilitate movement of the solids to the outlet openings. This can be accomplished, for example, using the jetting system described above with respect to FIG. 20 (including liquid jetting fluid supply conduit 305, gas jetting supply conduit 307, jetting channel or conduit 309, and jetting outlets 311 and 319) or the jetting conduit 182 of FIG. 18.

The method can additionally include throttling the flow of the solids from the solids outlet openings. This can be accomplished, for example, using the solids flow control valves 162, 164 of FIG. 15, and/or the solids flow control vessel arrangement described above with respect to FIG. 20 (including the solids flow control vessel 386, the jetting system 317, and the solids flow control valve 375). The method can be performed as an essentially continuous method, such that the method includes adding more of the solids to the vessel at essentially the same rate as the solids are extracted from the vessel. As suggested above, some of the liquid can be removed along with the solids at the solids outlet openings, while other of the fluid can be removed generally free of the solids. For example, the liquid extraction system depicted in FIG. 13 (including liquid outlet openings 126, fluid conduits 136a, 136b (see also FIG. 15), liquid extraction control valves 174a, 174b (FIG. 15), and liquid extraction trunk lines 176a, 176b) can be used to extract the liquid from the reaction vessel 100 relatively free of solids. The two ways of removing the liquids (i.e., with the solids and free of the solids) together define a liquid extraction rate, i.e., a rate at which the liquid is extracted from the vessel. In one example the liquid extraction rate is selected to maintain an essentially constant ratio of the solids to the liquid within the vessel. Accordingly, the method can include adding more of the liquid to the vessel to maintain the essentially constant ratio of the solids to the liquid within the vessel. As described above with respect to FIG. 16, liquid can be added to the vessel using a liquid supply system, which is depicted in FIG. 16 as including the liquid supply subsystems 106 and 108.

The method can further include controlling the solids and/or liquid extraction rates as a function of a variable. In one example, wherein the solids are extracted at the solids outlet openings at a solids extraction rate, the method includes monitoring the liquid extracted from the vessel for a predetermined condition, and controlling at least one of the liquid extraction rate or the solids extraction rate as a function of the monitoring of the liquid for the predetermined condition. For example, if the desired reaction is to remove a substance from the liquid (e.g., removing a contaminant by contacting the liquid with a solid catalyst), then the liquid can be monitored (by chemical assay, for example) as it is extracted from the vessel to determine if the substance has been removed to the desired level. If not, then the rate of extraction of the liquid can be slowed to allow more reaction time with the solids. Alternately (or additionally), the rate of extraction of the solids can be increased to expose the liquid in the reaction vessel to more of the reacting solids. In another example, if the liquid is being used to extract metals from ore (the solids), then the liquid can be monitored as it is extracted from the vessel to determine if it is near saturation with the metals. If it is not, then the rate of liquid extraction can be slowed, as well as the rate of the solids extraction. As an alternate to monitoring the liquid extracted from the vessel for a predetermined condition, the solids extracted from the vessel can be monitored for a predetermined condition, and at least one of the liquid extraction rate or the solids extraction rate can be controlled as a function of the monitoring of the solids for the predetermined condition. For example, if the process is leaching metals from ore (the solids) using a lixivant (the liquid), then the ore extracted from the vessel can be assayed to determine if sufficient metals have been recovered from the ore. If not, then the rate of ore (solids) extraction can be reduced, and/or the lixivant extraction rate can be increased (such that more fresh lixivant contacts the ore to remove the metals). In one example, the solids are extracted from the vessel at a rate such that the solids added to the vessel are resident within the vessel for not more than ten days.

The method can additionally include providing a solids flow control vessel (e.g., solids control vessels 386, 486 and 586 of respective FIGS. 20, 21 and 23). The method then includes accumulating the solids extracted at the outlet opening (e.g., 325, FIG. 20) into the solids flow control vessel, and fluidizing at least some of the solids accumulated into the solids flow control vessel. For example, the jetting system 317 of FIG. 20 can be used to fluidize at least some of the solids in the slurry zone "SL". The solids are then extracted from the solids flow control vessel at a solids flow rate (e.g., the rate at which the solids pass out of the solids flow control vessel 386 through the standpipe 344). In this instance the fluidizing of the solids accumulated into the solids flow control vessel can be controlled to thereby affect the solids flow rate. That is, with respect to the example depicted in FIG. 20, the rate at which the jetting fluid is introduced into the solids flow control vessel 386 by the jetting system 317 determines (at least in part) the extent of fluidization of the solids in the vessel 386, and thus the rate at which the solids will be removed from the vessel 386.

The method can further include heating or cooling the liquid within the vessel. This can be accomplished in a number of ways. In one example the liquid can be heated or cooled before it is introduced into the vessel. In another example, a heat exchanger can be placed in the interior volume of the vessel to heat or cool the liquid. In yet another example the walls and/or bottom of the vessel can be heated or cooled to cause the liquid in contact therewith to become heated or cooled (respectively). Likewise, the method can further include heating or cooling the solids in the vessel. This can be accomplished, for example, by heating or cooling the solids before they are introduced into the vessel. The method can also include recirculating the liquid within the vessel. This can be accomplished, for example, by using a circulating pump to extract liquid from the liquid extraction trunk lines (176a-c, FIG. 15), and discharging it though the liquid supply subsystems (106, 108, FIG. 16). In one example, only a portion of the liquid is recirculated, and fresh liquid is also added to the reaction vessel.

As indicated above, the method can be performed as an essentially continuous process, in which event the solids and/or the liquid are extracted from the vessel at an essentially continuous solids extraction rate. Alternately, the method can be performed as an essentially batch process, in which event the solids and/or the liquid are extracted from the vessel at periodic intervals. In one example all of the solids and/or liquid can be extracted from the vessel before additional solids and/or liquid are added to the vessel. In another example a portion of the solids and/or the liquid in the vessel can be extracted at periodic intervals, and additional solids and or liquid (optionally) added at similar periodic intervals.

The following table ("Table 1") provides some exemplary dimensions for a reaction vessel (e.g., reaction vessel 100 of FIGS. 1–17) and throughput rates for various solids and liquids. It will be appreciated that this table is exemplary only and not intended to suggest any limitations on the dimensions of the reaction vessel, or processing rates using the reaction vessel.

TABLE 1

| | | | | | |
|---|---|---|---|---|---|
| Effective height "H"[1], m | 30.00 | 30.00 | 30.00 | 30.00 | 30.00 |
| min height of ore, m | 25.00 | 25.00 | 25.00 | 25.00 | 25.00 |
| Effective width "W"[2], m | 15.00 | 30.00 | 26.79 | 26.79 | 26.79 |
| Leach Cycle, days | 2.00 | 10.00 | 10.00 | 10.00 | 2.00 |
| Production rate, mtpd ore[3] | 6,000.00 | 6,000.00 | 150,000 | 150,000 | 150,000 |
| Specific gravity of solids | 2.60 | 2.60 | 2.60 | 2.60 | 2.60 |
| Specific gravity of liquid | 1.05 | 1.05 | 1.05 | 1.05 | 1.05 |
| Number of compartments[4] | 1.00 | 1.00 | 3.00 | 3.00 | 3.00 |
| Void fraction, %[5] | 0.20 | 0.20 | 0.20 | 0.20 | 0.20 |
| Calculate side wall length "L"[6], m | 15.38 | 38.46 | 358.97 | 358.97 | 71.79 |
| Ratios | | | | | |
| H:W | 2 | 1 | 1.12 | 1.12 | 1.12 |
| L:H | 0.512821 | 1.282051 | 11.965812 | 11.965812 | 2.393162 |

TABLE 1-continued

| | | | | | |
|---|---|---|---|---|---|
| L:W | 1.025641 | 1.282051 | 13.401709 | 13.401709 | 2.680342 |
| P:H[7] | 2.025641 | 4.564103 | 25.717338 | 25.717338 | 6.572039 |

[1] Effective height "H" in meters, defined above with respect to FIG. 13.
[2] Effective width "W" in meters, defined above with respect to FIG. 13.
[3] mtpd: metric tons per day.
[4] For example, vessel 100 (FIG. 1) has one compartment, whereas vessel 200 (FIG. 19) has three compartments.
[5] "Void fraction" is the ratio of the volume taken up by liquid spaces (the voids) to the total volume of material in the vessel, expressed here as a percent.
[6] L is interior length of vessel - see FIG. 4.
[7] "P" is perimeter distance = 2L + 2W As described previously, embodiments of the present invention can also be used in processes wherein a reaction between the solids and the liquid does not necessarily occur. Whereas the effective height "H" (FIG. 13) can be selected to cause an increase in the rate of a chemical reaction, it is not necessary that a chemical reaction take place. One example of the present invention thus provides for a wash vessel, which can be constructed similar to any of the vessels 100, 200, 300, 400 and 500, described above, with the exception that the effective height "H" is selected only to enable the solids to flow from the vessel via the solids extraction system under the influence of gravity alone. In this instance to the extent that any "reaction" occurs, it can include enhancing osmotic potential between liquid solutions of different reagent or reactant concentrations inside pore space of the solids which is in communication in terms of fluid flow with the liquids between the solids. This can be the characteristic of a wash process where low concentration liquids or clean water is circulated throughout the vessel and creates an osmotic potential between this pore space of higher concentration of reagents (for example), and the lower concentrations of the interstitial space between solids. This osmotic potential effect is not to be confused with adhesion effects that draw the liquids into the solids pore space under "first wetting" conditions where the solids may be essentially dry within the pore spaces.

Another example of a generally non-reacting use of the vessels 100, 200, 300, 400 and 500, described above, is as a de-watering vessel, i.e., drying of solids fines or any type of particulated solids which absorb water and need de-watering. In this instance a solids/liquids mix or slurry enters the top of the vessel (having an appearance of surface wetted solids), and a relatively dry or dry-looking mixture of solids is removed from the vessel with the solids extraction system. This can be accomplished by mixing the solids/liquid being added to the vessel an absorbant solid of a certain physical characteristic such as size relative to the target solids, or magnetic character, or hydrophilic character, that enables the absorbent to be readily separated from the target solids after the mix is extracted from the vessel using the solids extraction system. This absorbent material is then separated with screens or magnets, or other means, and is then directed into a de-watering circuit (such as a centrifuge or dryer or suction filter or pressure filter) after which it is re-introduced at the top of the de-watering vessel to once again act to absorb water away from the pore spaces and surfaces of the target solids. Such a material can be called a "separable solid desiccant." Yet another embodiment of the desiccant is a material which draws the water away from the target solids by hydration such as common product desiccants. After physical separation, a chemical process can be preformed on the desiccant to de-hydrate it and return it to the top of the de-watering vessel. It will be appreciated that other means of dewatering the engineered solid used as the absorbent can be used such as rolling the water out of a flexible absorbent (such as a spongy material) which will resume its original shape so as to be economically reusable as an absorbent.

In the methods described above, such can include as part of the act of placing solids within the vessel, placing filler or inert material in the vessel along with a solid to be reacted with the liquid. This can be done for a number of reasons. In one example the solids to be processed (e.g. ore or coal among others) may need to be crushed and ground to a fineness which reduces the permeability of the process solutions to a level too low for effective processing. In this case, the material can be agglomerated onto larger size material with cement or polymeric substances that essentially glue it to the material, exposing the surfaces of the material for processing, but allowing an improved permeability. Alternately the material can be mixed with a much more porous material which by itself insures greater permeability of the mixture. In the case of material for agglomeration, it will typically be larger than the target material grain size and will also typically be larger lumps of the same material (i.e., not crushed or ground as fine as the target material) which means it will produce some values, or it can be without any values, such as waste rock.

Further, the solid material to be processed in the vessel may, in the case of oxidation of sulfur-containing compounds for example, need to be essentially diluted to reduce the exothermic or auto-thermal character of the mixture and/or afford a much higher heat transmissivity and/or heat conductance in order to carry away heat from the target material which is being oxidized. In this case, filler material can include low grade material of the same composition (i.e., less sulfur compounds within it) or it can be an inert filler such as waste rock or even steel shot. To increase the heat transmissivity, iron-containing filler material can be used, including hematite or magnetite.

The choice of the filler material is based not only on the ability of the material to increase permeability or heat transmissivity, it can also be based on the economics of regenerating the material back to the earlier step in the process where filler material is added to the target material to be processed. In the case of agglomeration this is not typically possible, so the use of a common rock which can have some values provides better economics. Typically, one of the most economic means of regeneration of filler material which is merely mixed with the target material includes screening and/or gravity separation. Steel shot can be separated with either, or a combination of, these methods. Large lumps of waste rock can be separated by simple screening alone. Hematite or magnetite can be separated through gravity or cyclonic means such as is employed in coal wash plants. Magnetic separation can also be used although it may not be as economical.

The methods described above can further include adding a liquid catalyst, a solid catalyst, and/or a biological catalyst to the vessel along with the other solids and the liquid. For example, a tungsten coated sand can be used as a solid catalyst to contact faces of coal particles to thereby catalyze a reaction of sulfur within the coal with adjacent liquid.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A liquids/solids reaction vessel configured to contain a mixture of at least one liquid and at least one solid, the vessel comprising:
   a closed perimeter wall defined by an effective height;
   a bottom connected to the closed perimeter wall to thereby define a vessel volume configured to contain the mixture of the at least one solid and the at least one liquid;
   a solids extraction system located in at least one of the bottom or in the perimeter wall proximate the bottom, wherein the effective height of the perimeter wall is selected to:
   produce a pressure proximate the bottom of the reaction vessel selected to eject the at least one solid through the solids extraction system under the influence of gravity alone; and
   one of initiate, or cause an increase in, a reaction rate between the at least one liquid and the at least one solid;
   and further wherein:
   the perimeter wall comprises two substantially parallel sidewalls, and two generally parallel endwalls which are connected to the sidewalls to thereby form a generally rectangular form of the perimeter wall when viewed in a plan view; and
   the sidewalls are each defined by an interior sidewall length, and the ratio of the interior sidewall length to the effective height of the perimeter wall is greater than about 0.15:1.

2. The reaction vessel of claim 1, and wherein the effective height of the perimeter wall is at least 20 meters.

3. The reaction vessel of claim 1, and wherein the effective height of the perimeter wall is at least 25 meters.

4. The reaction vessel of claim 1, and wherein the effective height of the perimeter wall is at least 30 meters.

5. The reaction vessel of claim 1, and wherein:
   the perimeter wall defines a perimeter wall distance within the vessel volume; and
   the ratio of the perimeter wall distance to the effective height of the perimeter wall is at least 0.5:1.

6. The reaction vessel of claim 1, and wherein:
   the sidewalls are each defined by an interior sidewall length, the endwalls are each defined by an interior endwall length, and the ratio of the interior sidewall length to the interior endwall length is at least 1:1.

7. A liquids/solids reaction vessel configured to contain a mixture of at least one liquid and at least one solid, the vessel comprising:
   a closed perimeter wall defined by an effective height;
   a bottom connected to the closed perimeter wall to thereby define a vessel volume configured to contain the mixture of the at least one solid and the at least one liquid;
   a solids extraction system located in at least one of the bottom or in the perimeter wall proximate the bottom; and
   wherein the effective height of the perimeter wall is selected to:
   produce a pressure proximate the bottom of the reaction vessel selected to eject the at least one solid through the solids extraction system under the influence of gravity alone; and
   one of initiate, or cause an increase in, a reaction rate between the at least one liquid and the at least one solid;
   and wherein the perimeter wall comprises two generally parallel sidewalls, and two generally parallel endwalls which are connected to the sidewalls to thereby form a generally rectangular form of the perimeter wall when viewed in a plan view, and the endwalls are each defined by an interior endwall length, and the ratio of the interior endwall length to the effective height of the perimeter wall is less than about 1.5:1.

8. The reaction vessel of claim 1 or 7, and wherein the perimeter wall defines therein a plurality of solids outlets located proximate the bottom, and wherein the solids extraction system comprises a plurality of solids extraction conduits in communication with the plurality of solids outlets.

9. The reaction vessel of claim 8, and wherein:
   the bottom is configured in an inverted "V" shape defined by an apex; and
   at least some of the plurality of solids extraction conduits extend from the associated solids outlets along the bottom towards the apex of the bottom.

10. A liquids/solids reaction vessel configured to contain a mixture of at least one liquid and at least one solid, the vessel comprising:
    a closed perimeter wall defined by an effective height;
    a bottom connected to the closed perimeter wall to thereby define a vessel volume configured to contain the mixture of the at least one solid and the at least one liquid;
    a solids extraction system located in at least one of the bottom or in the perimeter wall proximate the bottom; and
    wherein the effective height of the perimeter wall is selected to:
    produce a pressure proximate the bottom of the reaction vessel selected to eject the at least one solid through the solids extraction system under the influence of gravity alone; and
    one of initiate, or cause an increase in, a reaction rate between the at least one liquid and the at least one solid;
    and wherein:
    the perimeter wall defines therein a plurality of solids outlets located proximate the bottom, and wherein the solids extraction system comprises a plurality of solids extraction conduits in communication with the plurality of solids outlets;
    the bottom is configured in an inverted "V" shape defined by an apex;
    at least some of the plurality of solids extraction conduits extend from the associated solids outlets along the bottom towards the apex of the bottom;
    the perimeter wall comprises two substantially parallel sidewalls, and two substantially parallel endwalls which are connected to the sidewalls, to thereby form a substantially rectangular form of the perimeter wall when viewed in a plan view;
    the plurality of solids outlets are arranged in rows along each of the sidewalls; and the solids extraction conduits that extend from along the bottom towards the apex of the bottom are associated with periodic ones of the solids outlets in the row of solids outlets.

11. The reaction vessel of claim 8, and further comprising a plurality of solids extraction control valves, each solids extraction control valve being located in an associated solids extraction conduit.

12. The reaction vessel of claim 8, and further comprising a solids extraction trunk line in communication with at least some of the solids extraction conduits.

13. The reaction vessel of claim 8, and wherein at least some of the plurality of solids extraction conduits extend from the associated solids outlets along the bottom.

14. A liquids/solids reaction vessel configured to contain a mixture of at least one liquid and at least one solid, the vessel comprising:
- a closed perimeter wall defined by an effective height;
- a bottom connected to the closed perimeter wall to thereby define a vessel volume configured to contain the mixture of the at least one solid and the at least one liquid;
- a solids extraction system located in at least one of the bottom or in the perimeter wall proximate the bottom; and
- wherein the effective height of the perimeter wall is selected to:
  - produce a pressure proximate the bottom of the reaction vessel selected to eject the at least one solid through the solids extraction system under the influence of gravity alone; and
  - one of initiate, or cause an increase in, a reaction rate between the at least one liquid and the at least one solid;

and further wherein:
the perimeter wall defines therein a plurality of solids outlets located proximate the bottom, and wherein the solids extraction system comprises a plurality of solids extraction conduits in communication with the plurality of solids outlets; and
the solids extraction system further comprises a plurality of solids extraction tunnel members defining solids extraction tunnels in communication with associated ones of the solids outlets, the solids extraction tunnel members extending from the sidewalls along the bottom.

15. The reaction vessel of claim 14, and wherein the solids extraction tunnel members further define a plurality of liquid openings therein to allow the liquid to enter the solids extraction tunnels.

16. The reaction vessel of claim 14, and wherein each of the solids extraction tunnel members comprise a jetting system configured to introduce a jetting fluid into the solids extraction tunnels.

17. A liquids/solids reaction vessel configured to contain a mixture of at least one liquid and at least one solid, the vessel comprising:
- a closed perimeter wall defined by an effective height;
- a bottom connected to the closed perimeter wall to thereby define a vessel volume configured to contain the mixture of the at least one solid and the at least one liquid;
- a solids extraction system located in at least one of the bottom or in the perimeter wall proximate the bottom; and
- wherein the effective height of the perimeter wall is selected to:
  - produce a pressure proximate the bottom of the reaction vessel selected to eject the at least one solid through the solids extraction system under the influence of gravity alone; and
  - one of initiate, or cause an increase in, a reaction rate between the at least one liquid and the at least one solid;

and further wherein:
the perimeter wall defines therein a plurality of solids outlets located proximate the bottom, and wherein the solids extraction system comprises a plurality of solids extraction conduits in communication with the plurality of solids outlets; and
the solids extraction system further comprises a plurality of solids flow control vessels in communication with at least some of the solids extraction conduits, each solids flow control vessel defined by a vessel bottom, each solids flow control vessel comprising a jetting system oriented at least one of in or proximate to the vessel bottom and configured to inject a jetting liquid into the solids flow control vessel, and wherein each solids flow control vessel defines a solids vessel outlet above the jetting system.

18. The reaction vessel of claim 17, and wherein the continuous perimeter wall is a honeycomb hollow-wall type wall defining a plurality of adjacent, vertically oriented shafts disposed therein, and further wherein the solids flow control vessels are define by the vertically oriented shafts.

19. The reaction vessel of claim 1 or 7, and further comprising a liquid extraction system located in at least one of the bottom or in the perimeter wall proximate the bottom.

20. The reaction vessel of claim 19, and wherein the liquid extraction system defines a plurality of liquid outlet openings proximate the bottom, and the reaction vessel further comprises a liquid permeable material placed over the liquid outlet openings.

21. The reaction vessel of claim 20, and wherein the liquid permeable material comprises gravel.

22. The reaction vessel of claim 20, and wherein the liquid extraction system comprises a plurality of liquid extraction conduits located proximate the bottom, and further wherein the liquid outlet openings are defined in the plurality of liquid extraction conduits.

23. A liquids/solids reaction vessel configured to contain a mixture of at least one liquid and at least one solid, the vessel comprising:
- a closed perimeter wall defined by an effective height;
- a bottom connected to the closed perimeter wall to thereby define a vessel volume configured to contain the mixture of the at least one solid and the at least one liquid;
- a solids extraction system located in at least one of the bottom or in the perimeter wall proximate the bottom; and
- wherein the effective height of the perimeter wall is selected to:
  - produce a pressure proximate the bottom of the reaction vessel selected to eject the at least one solid through the solids extraction system under the influence of gravity alone; and
  - one of initiate, or cause an increase in, a reaction rate between the at least one liquid and the at least one solid;
- and further comprising a liquid extraction system located in at least one of the bottom or in the perimeter wall proximate the bottom; and wherein the closed perimeter wall is defined by an upper edge and a lower interior edge, and the liquid extraction system is further located at least a third of the effective height from the lower interior edge.

24. The reaction vessel of claim 19, and wherein the perimeter wall defines therein a plurality of liquid outlets located proximate the bottom, and wherein the liquid extraction system comprises a plurality of liquid extraction conduits in communication with the plurality of liquid outlets.

25. A liquids/solids reaction vessel configured to contain a mixture of at least one liquid and at least one solid, the vessel comprising:
a closed perimeter wall defined by an effective height;
a bottom connected to the closed perimeter wall to thereby define a vessel volume configured to contain the mixture of the at least one solid and the at least one liquid;
a solids extraction system located in at least one of the bottom or in the perimeter wall proximate the bottom; and
wherein the effective height of the perimeter wall is selected to:
produce a pressure proximate the bottom of the reaction vessel selected to eject the at least one solid through the solids extraction system under the influence of gravity alone; and
one of initiate, or cause an increase in, a reaction rate between the at least one liquid and the at least one solid;
and further comprising a liquid extraction system located in at least one of the bottom or in the perimeter wall proximate the bottom;
and wherein:
the perimeter wall defines therein a plurality of liquid outlets located proximate the bottom, and wherein the liquid extraction system comprises a plurality of liquid extraction conduits in communication with the plurality of liquid outlets;
the liquid outlets are lower liquid outlets;
the closed perimeter wall is defined by an upper edge and a lower interior edge;
the perimeter wall defines a plurality of intermediate liquid outlets located at least a third of the effective height from the lower interior edge of the perimeter wall; and
the liquid extraction system further comprises a plurality of intermediate liquid extraction conduits in communication with the intermediate liquid outlets.

26. The reaction vessel of claim 25, and wherein:
the perimeter wall comprises two substantially parallel sidewalls, and two substantially parallel endwalls which are connected to the sidewalls, to thereby form a substantially rectangular form of the perimeter wall when viewed in a plan view; and
the plurality of lower liquid outlet and intermediate liquid outlets are arranged in rows along each of the sidewalls.

27. The reaction vessel of claim 24, and wherein the liquid extraction system further comprises a plurality of liquid extraction control valves placed in associated ones of the liquid extraction conduits.

28. The reaction vessel of claim 19, and wherein the perimeter wall defines therein a plurality of outlets located proximate the bottom, and wherein the solids extraction system comprises a plurality of solids extraction conduits in communication with the plurality of outlets, and the liquid extraction system comprises a plurality of liquid extraction conduits in communication with the plurality of solids extraction conduits.

29. The reaction vessel of claim 19, and further comprising a liquid supply system.

30. The reaction vessel of claim 29, and wherein:
the perimeter wall comprises two substantially parallel sidewalls defined by an upper edge, and two substantially parallel endwalls which are connected to the sidewalls, to thereby form a substantially rectangular form of the perimeter wall when viewed in a plan view; and
the liquid supply system comprises a liquid supply conduit that is substantially parallel to the sidewalls, the liquid supply conduit defining therein a plurality of liquid supply outlets.

31. The reaction vessel of claim 30, and wherein the liquid supply conduit is located proximate the upper edge.

32. The reaction vessel of claim 30, and wherein:
the sidewalls are each defined by an upper edge;
the liquid supply conduit comprises a first liquid supply conduit which is located substantially equidistant between the sidewalls and between the upper edge of the sidewalls and the bottom; and
and the liquid supply system further comprises second and third liquid supply conduits which are located proximate to, and substantially parallel with, the upper edge of the sidewalls.

33. The reaction vessel of claim 30, and wherein the liquid supply system further comprises:
a plurality of liquid supply conduits in communication with associated ones of the liquid supply outlets; and
a plurality of liquid supply control valves located in associated ones of the liquid supply conduits.

34. The reaction vessel of claim 1, and wherein the closed perimeter wall is a honeycomb hollow-wall type wall defining a plurality of adjacent, vertically oriented shafts disposed therein.

35. The reaction vessel of claim 1, and further comprising a jetting system oriented proximate the bottom of the vessel and configured to introduce a jetting fluid into the reaction vessel.

* * * * *